United States Patent
Xiang

(10) Patent No.: US 11,210,516 B2
(45) Date of Patent: Dec. 28, 2021

(54) AR SCENARIO PROCESSING METHOD AND DEVICE, AND COMPUTER STORAGE MEDIUM

(71) Applicant: Tencent Technology (Shenzhen) Company Limited, Shenzhen (CN)

(72) Inventor: Xiaoming Xiang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 10 days.

(21) Appl. No.: 16/567,886

(22) Filed: Sep. 11, 2019

(65) Prior Publication Data

US 2020/0012858 A1 Jan. 9, 2020

Related U.S. Application Data

(63) Continuation of application No. PCT/CN2018/103612, filed on Aug. 31, 2018.

(30) Foreign Application Priority Data

Sep. 4, 2017 (CN) .......................... 201710787487.6

(51) Int. Cl.
*G06K 9/00* (2006.01)
*G06T 7/246* (2017.01)
*G06K 9/62* (2006.01)

(52) U.S. Cl.
CPC ..... *G06K 9/00671* (2013.01); *G06K 9/00744* (2013.01); *G06K 9/6232* (2013.01);
(Continued)

(58) Field of Classification Search
CPC ........... G06K 9/00671; G06K 9/00744; G06K 9/6232; G06T 7/248; G06T 2207/10016; G06T 2207/30208
See application file for complete search history.

(56) References Cited

U.S. PATENT DOCUMENTS

2003/0165276 A1  9/2003 Seeger et al.
2012/0146998 A1* 6/2012 Kim ..................... G06T 7/194
                                                       345/419
(Continued)

FOREIGN PATENT DOCUMENTS

CN    101101505 A  *  1/2008
CN    101101505 A     1/2008
(Continued)

OTHER PUBLICATIONS

Chinese Office Action dated Jun. 21, 2018 in Chinese Application 201710787487.6 with concise English Translation, (11 pages).

(Continued)

*Primary Examiner* — Terrell M Robinson
(74) *Attorney, Agent, or Firm* — Oblon, McClelland, Maier & Neustadt, L.L.P.

(57) ABSTRACT

Aspects of the disclosure provide methods and apparatuses for processing an augmented reality (AR) scenario. In some examples, an apparatus includes processing circuitry. The processing circuitry obtains first feature point information in a first video frame according to a target marker image. The processing circuitry tracks, according to an optical flow tracking algorithm, a first feature point corresponding to the first feature point information. The processing circuitry determines second feature point information in a second video frame according to the tracked first feature point. The processing circuitry constructs a homography matrix between the second video frame and the target marker image according to the second feature point information and a first source feature point of the target marker image. The processing circuitry performs a first AR processing on the second video frame according to the homography matrix.

20 Claims, 10 Drawing Sheets

(52) U.S. Cl.
CPC .... *G06T 7/248* (2017.01); *G06T 2207/10016* (2013.01); *G06T 2207/30208* (2013.01)

(56) References Cited

U.S. PATENT DOCUMENTS

| | | | |
|---|---|---|---|
| 2012/0180084 A1 | 7/2012 | Huang et al. | |
| 2014/0022394 A1* | 1/2014 | Bae | G06K 9/00624 348/169 |
| 2015/0193970 A1 | 7/2015 | Liu et al. | |
| 2016/0342837 A1* | 11/2016 | Hong | G06K 9/46 |
| 2016/0364867 A1* | 12/2016 | Moteki | G06T 7/73 |
| 2019/0244050 A1* | 8/2019 | Lin | G06K 9/2063 |
| 2019/0302598 A1* | 10/2019 | Ichikawa | H04N 13/388 |

FOREIGN PATENT DOCUMENTS

| | | | |
|---|---|---|---|
| CN | 103839277 A | | 6/2014 |
| CN | 104050475 A | * | 9/2014 |
| CN | 104050475 A | | 9/2014 |
| CN | 107590453 A | | 1/2018 |

OTHER PUBLICATIONS

PCT International Search Report Issued in International Application PCT/CN2018/103612 dated Nov. 14, 2018 with English Machine Translation, (7 pages).

Written Opinion Issued in International Application PCT/CN2018/103612 dated Nov. 14, 2018; (5 pages).

European Search Report dated Apr. 23, 2021 in Application No. 18851007.7, (10 pages).

Cheok et al., "Augmented Reality Camera Tracking with Homographies," IEEE Computer Graphics and Applications, Nov. 1, 2002 (7 pages).

Lee et al., "Viewpoint Stabilization for Live Collaborative Video Augmentations," IEEE International Symposium on Mixed and Augmented Reality, Oct. 22, 2006 (2 pages).

* cited by examiner

AR SCENARIO PROCESSING METHOD AND DEVICE, AND COMPUTER STORAGE MEDIUM

RELATED APPLICATION

This application is a continuation of International Application No. PCT/CN 2018/103612, filed on Aug. 31, 2018, which claims priority to Chinese Patent Application No. 201710787487.6, entitled "AR SCENARIO PROCESSING METHOD, APPARATUS, AND DEVICE, AND COMPUTER STORAGE MEDIUM" filed on Sep. 4, 2017. The entire disclosures of the prior applications are hereby incorporated by reference in their entirety.

FIELD OF THE TECHNOLOGY

This application relates to the field of augmented reality (AR) technologies, and in particular, to an AR scenario processing method and device, and a computer storage medium.

BACKGROUND OF THE DISCLOSURE

An augmented reality (AR) technology is a technology of computing a position of a target object in a shot image in real time, and then adding virtual content such as a virtual image and a virtual video on the corresponding image position. Based on the AR technology, a virtual scenario and a real environment may be combined, and interact effectively.

The AR scenario may be implemented based on an implementation of an image recognition technology. That is, an image object on which virtual content needs to be superimposed is recognized respectively in each video frame by using the image recognition technology, and then a respective position of the image object in each video frame is determined. The virtual content is superimposed according to the respective position. For example, if a desk is recognized in a shot video frame by using the image recognition technology, virtual content such as a book and a computer is superimposed on a desktop of the desk according to the position of the desk in the image.

In the foregoing AR implementation, because image analysis and recognition need to be performed on each shot video frame, a lot of software and hardware resources are consumed, and because the entire video frame needs to be analyzed and recognized during the image recognition, a lot of time is consumed. Especially when a shot image in a real environment is complicated, more time is consumed for recognizing the image object.

SUMMARY

Aspects of the disclosure provide methods and apparatuses for processing an augmented reality (AR) scenario. In some examples, an apparatus includes processing circuitry. The processing circuitry obtains first feature point information in a first video frame according to a target marker image. The processing circuitry tracks, according to an optical flow tracking algorithm, a first feature point corresponding to the first feature point information. The processing circuitry determines second feature point information in a second video frame according to the tracked first feature point. The processing circuitry constructs a homography matrix between the second video frame and the target marker image according to the second feature point information and a first source feature point of the target marker image. The processing circuitry performs a first AR processing on the second video frame according to the homography matrix.

In some embodiments, before obtaining the first feature point information, the processing circuitry obtains first feature description information of the first video frame, and retrieves the target marker image from an attribute database according to the first feature description information.

In some embodiments, the processing circuitry obtains an initial homography matrix between the first video frame and the target marker image. The processing circuitry transforms the target marker image into a transformed target marker image based on the initial homography matrix. The first source feature point of the target marker image is transformed into a first transformed source feature point in the transformed target marker image. The processing circuitry determines the first feature point in the first video frame according to a position of the first transformed source feature point in the transformed target marker image. The processing circuitry obtains position information of the first feature point in the first video frame.

In some embodiments, the processing circuitry determines a first template region in the transformed target marker image according to the position of the first transformed source feature point in the transformed target marker image. The processing circuitry determines a first search region in the first video frame according to a position of an initial feature point that is associated with the first transformed source feature point and that is in the first video frame. The processing circuitry performs image search in the first search region according to the first template region. The processing circuitry determines the first feature point according to the initial feature point when a first image similarity between a part of the first search region and the first template region is greater than a first preset similarity threshold.

In some embodiments, the processing circuitry determines an optical flow field between the first video frame and the second video frame. The processing circuitry determines an estimated position in the second video frame based on a motion vector for the first feature point in the optical flow field and the position of the first feature point in the first video frame. The processing circuitry determines a second template region in the first video frame according to the position of the first feature point in the first video frame. The processing circuitry determines a second search region in the second video frame according to the estimated position in the second video frame. The processing circuitry performs image search in the second search region according to the second template region. The processing circuitry determines the second feature point information according to the estimated position when a second image similarity between a part of the second search region and the second template region is greater than a second preset similarity threshold.

In some embodiments, before obtaining the first feature description information of the first video frame, the processing circuitry obtains a preprocessed marker image. An image size of the preprocessed marker image is greater than an image size of the first video frame, and the preprocessed marker image being a grayscale image. The processing circuitry determines second feature description information of the preprocessed marker image. The processing circuitry stores the second feature description information into the attribute database.

In some embodiments, after determining the second feature point information, the processing circuitry determines whether an information amount of the second feature point information is less than an amount threshold. The processing circuitry determines a second source feature point in the target marker image when the information amount of the second feature point information is determined to be less than the amount threshold, the second source feature point being transformed into a second transformed source feature point in the transformed target marker image. The processing circuitry determines additional second feature point information in the second video frame according to a position of the second transformed source feature point in the transformed target marker image.

In some embodiments, the processing circuitry determines a first extrinsic parameter matrix of the apparatus according to the homography matrix when the second video frame is captured by the apparatus. The processing circuitry performs the first AR processing on the second video frame based on the first extrinsic parameter matrix.

Aspects of the disclosure also provide a non-transitory computer-readable medium storing instructions which when executed by a computer cause the computer to perform the method for processing an augmented reality (AR) scenario.

BRIEF DESCRIPTION OF THE DRAWINGS

To describe technical solutions in the embodiments of this application clearer, the following simply describes the accompanying drawings according to descriptions of the embodiments. The accompanying drawings in the following descriptions are merely some embodiments of this application, and a person of ordinary skill in the art may further obtain other accompanying drawings according to the accompanying drawings.

DESCRIPTION OF EMBODIMENTS

Figure 1:
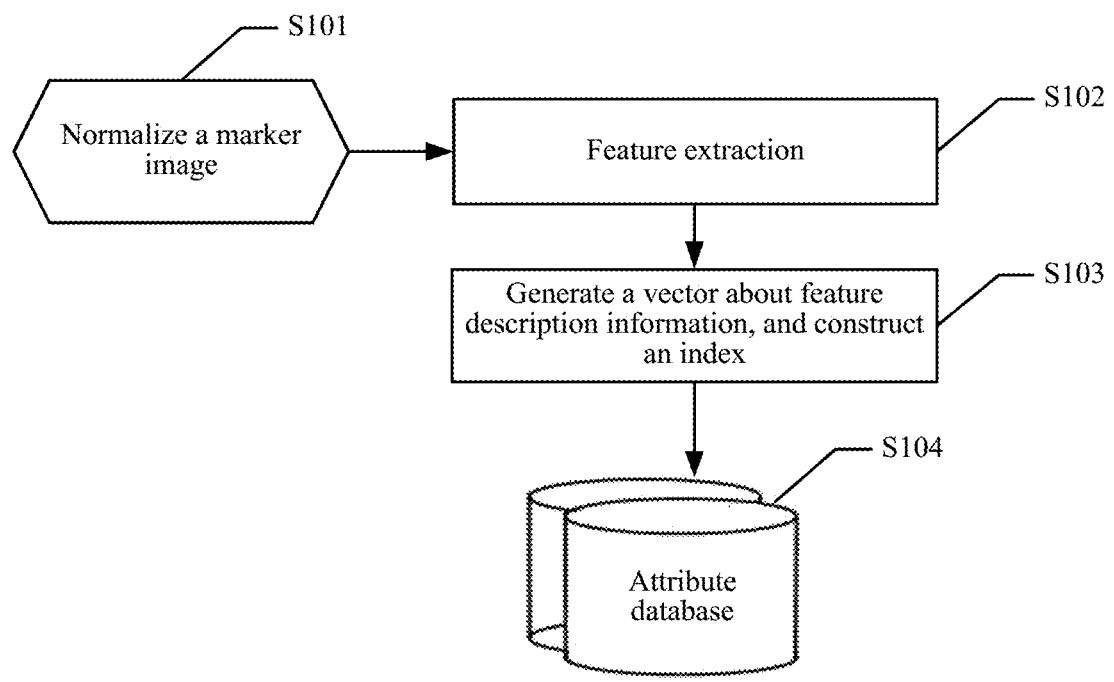
FIG. 1 is a schematic flowchart of configuring an attribute database and a marker image in an embodiment.

To make the objectives, the technical solutions, and the advantages of this application clearer, the following further describes this application in detail with reference to the accompanying drawings and the embodiments. It is understood that, specific embodiments described herein are only used for explaining this application, but not used for limiting this application.

To implement an AR scenario, in the embodiments of this application, a plurality of marker images including various objects may be set. After a video is shot by an image shooting apparatus related to an AR device, whether a video frame includes an object in a marker image may be first determined in an image recognition manner. If the video frame includes the object, the marker image is used as a target marker image, and the object in the marker image is a target object. In addition, tracking points about the target marker image are determined in the video frame. Based on these tracking points, in a subsequently shot video frame, these tracking points are tracked and recognized by using an optical flow tracking algorithm, to track and determine feature point information corresponding to feature points in a new video frame, and a homography matrix, that is an H matrix, between the new video frame and the target marker image is determined based on the feature point information. The virtual content is further superimposed according to the H matrix, to implement the AR scenario.

The marker images may be images preset by users or may be images obtained through shooting or may be digital images obtained through making. The marker image has higher resolution and regularity, and can recognize more feature points, to help better perform processing such as image recognition and H matrix generation subsequently.

By using the optical flow tracking algorithm, motion vectors of a lot of feature points on adjacent video frames (or two video frames having an inter-frame spacing) shot by the image shooting apparatus can be recognized, and may include a moving direction and a moving speed of the feature points on the video frames. According to the optical flow tracking algorithm, positions of feature points matching tracking points in a current video frame can be roughly determined based on positions of tracking points determined in a previous video frame. The tracking points on the previous video frame are determined according to the target marker image.

After it is recognized and determined that the video frame includes the target object in the target marker image, an optical flow tracking phase is entered. The tracking is performed between video frames in an optical flow tracking manner. Due to less time-consuming, a high tracking frame rate, a small change between two adjacent frames, and stable optical flow tracking of the tracking algorithm, matched feature points in the two video frames can be determined quickly, accurately, and efficiently. In an embodiment, when trackable feature points in the video frame are reduced due to quick moving of the target object, an environment illumination change, or a blocking change, point supplementing processing may be performed from the target marker image in a template matching manner, to supplement new feature points used for performing optical flow tracking, and supplement quality feature point in time to perform optical flow tracking, so that when the H matrix is computed subsequently, there are sufficient feature points to determine a mapping relationship, and more lasting optical flow tracking can be maintained.

The H matrix between images can better associate two video frames, and an extrinsic parameter matrix of the image shooting apparatus during shooting of the current video frame may be obtained according to the H matrix. The extrinsic parameter matrix is a current camera imaging parameter obtaining through solution. If virtual content needs to be superimposed on an actual object, the virtual content may be regarded as an actual object, and an actual object is regarded to correspondingly use the imaging parameter (the extrinsic parameter matrix) to perform imaging on the video frame of the image shooting apparatus. The imaging process may be regarded as a process of drawing a virtual object on the video frame based on the extrinsic parameter matrix.

In an embodiment, a marker image including an object may be first configured, to help perform object recognition on the video frame subsequently. After a marker image input by a user is received, as shown in FIG. 1, in step S101, the marker image may be first normalized. In step S102, feature extraction is performed on the normalized marker image. In an embodiment, ORiented Brief (ORB, which is one kind of image feature detection operator) information of a feature point is extracted from the marker image. The ORB information is used as feature description information of the feature point, and the ORB information includes information about pixel points around the feature point on the image, used for describing the corresponding feature point. Based on a similarity of ORB information between two feature points on two images respectively, whether the two feature points match may be determined. The feature points described in the ORB information may be referred to as ORB points. The ORB information extracted on the marker image refers to feature point description information of the feature points of the target object on the marker image.

After feature description information of a plurality of feature points on the marker image is obtained, in step S103, a vector about the feature description information is generated, and an index is constructed, that is, an index about the feature description information of the marker image is constructed. In an embodiment, a feature description sub-vector may be first generated, and then the index of the feature description information is constructed by using an LSH (Locality Sensitive Hashing) algorithm. In step S104, the feature description information for which the index has been constructed is used as the feature description information of the marker image and stored to an attribute database, and the feature description information of the marker image in the attribute database forms an ORB point set of the marker image.

The feature description information is extracted from the marker image, and the index of the feature description information is constructed by using the LSH algorithm, to complete preprocessing of a marker image set when the network is limited, so that in a subsequent recognition phase, ORB information is extracted based on the video frame shot by the image shooting apparatus, and retrieval is performed based on an index of the attribute database. A target marker image matching the video frame can be retrieved, and a target object in the video frame can be determined.

After configurations of the marker image and the attribute database are completed, subsequent object recognition processing may be performed, and object recognition is performed from the shot video frame, to determine a marker image associated with a currently shot video.

Figure 2:
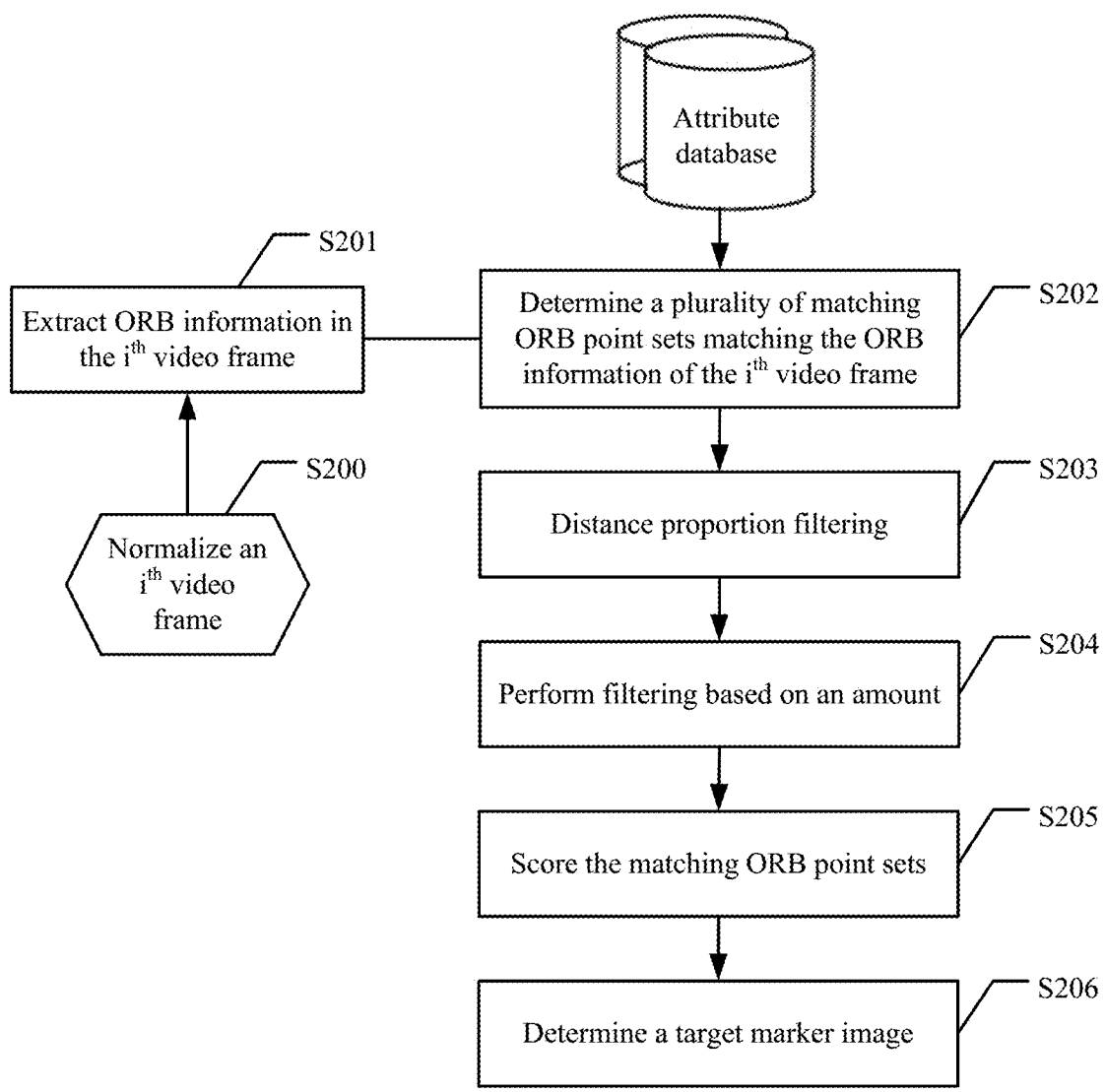
FIG. 2 is a schematic flowchart of a matching relationship between a video frame and a marker image in an embodiment.

The image shooting apparatus corresponding to the AR device is used to shoot an environment video, to obtain a video frame. As shown in FIG. 2, in step S200, an $i^{th}$ shot video frame is normalized. In step S201, ORB information in the $i^{th}$ video frame is extracted, and based on the ORB information of the $i^{th}$ video frame, retrieval is performed in the attribute database based on the index. A plurality of pieces of ORB information is extracted from the $i^{th}$ video frame, and the $i^{th}$ video frame is a current video frame in video frames shot by the image shooting apparatus.

In an embodiment, when retrieval is performed based on the index, in step S202, a plurality of matching ORB point sets matching the ORB information of the $i^{th}$ video frame is determined from the attribute database, and includes an optimal matching ORB point set and a suboptimal matching ORB point set. In each matching ORB point set, there is a sufficient amount of ORB information similar to corresponding ORB information of the $i^{th}$ video frame.

In step S203, distance proportion filtering is performed, to filter out some matching ORB point sets. Based on a vector Hamming distance of ORB point sets, the matching ORB point sets may be filtered based on a distance proportion, to determine better point sets from the matching ORB point sets. Perform distance proportion filtering is specifically: determining whether a similarity between matching ORB point sets determined from the matching ORB point sets and the ORB information of the $i^{th}$ video frame is greater than a preset filtering similarity threshold, to filter out matching ORB point sets with the similarity less than the preset filtering similarity threshold.

In step S204, filtering is further performed based on an amount, that is, filtering is performed based on an amount of ORB information of the filtered matching ORB point sets, and matching ORB point sets with the amount of the ORB information of the filtered matching ORB point sets less than a preset amount threshold are filtered out. Alternatively, N matching ORB point sets (N is a positive integer) with a greater amount of ORB information (greater than the preset amount threshold) are obtained from the filtered matching ORB point sets.

In other embodiments, step S204 may also be first performed to perform screening and filtering according to the amount of the ORB information, and then step S203 is performed to perform screening and filtering according to a distance proportion.

In step S205, the matching ORB point sets filtered after step S204 is performed are scored. The scoring may be specifically: performing scoring according to a quantity of feature points in the matching ORB point sets filtered after step S204 is performed. A larger quantity indicates a higher score, and the residual matching ORB point sets are sorted according to a scoring result. In step S206, a target marker image is determined according to the scoring result, and according to the scoring result, an ORB point set with the highest score is determined as an ORB point set finally associated with the $i^{th}$ video frame, and a marker image corresponding to the ORB point set with the highest score is determined as the target marker image for subsequently processing a video shot by the image shooting apparatus. The $i^{th}$ video frame may be correspondingly a first video frame.

In an embodiment, if matching ORB point sets matching the ORB information of the $i^{th}$ video frame cannot be determined from the attribute database, a next video frame is repeated to be processed according to the foregoing processing manner for the $i^{th}$ video frame.

In an embodiment, after it is determined that the $i^{th}$ video frame matches the target marker image, a video frame posterior to the $i^{th}$ video frame is processed based on a tracking algorithm combining optical flow tracking and template matching, to determine a relationship between the video frame posterior to the $i^{th}$ video frame and the target marker image, and determine an H matrix between the video frame posterior to the $i^{th}$ video frame and the target marker image, and the like.

Figure 3:
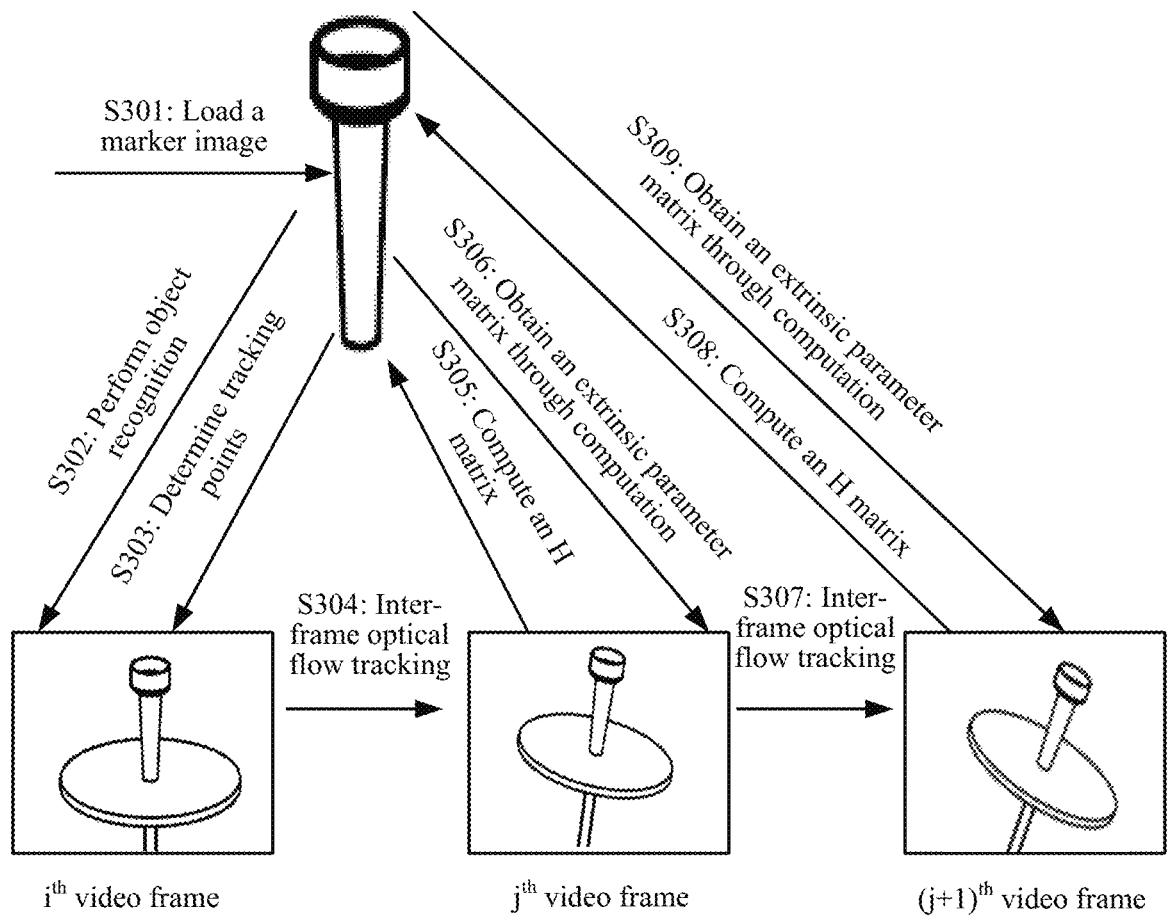
FIG. 3 is a schematic flowchart of performing object recognition on a video frame in an embodiment.

FIG. 3 is a schematic flowchart of performing object recognition on a video frame in an embodiment. Object recognition on the video frame may be performed on a smart device having an image analysis function. The smart device can receive video frames shot by an image shooting apparatus and perform object recognition on the video frames. In an embodiment, the method may be performed by a dedicated smart device or an AR device. An object recognition process includes the following steps S301 to S309. In this embodiment of the present disclosure, a target object being a "torch" is used as an example for description.

S301: Load a marker image.

The loading a marker image includes the following steps: obtaining a grayscale image scaling an input original marker image to a suitable dimension, where the processed grayscale image be greater than the size of a video frame on which object recognition needs to be performed, for example, may be 1.2 times (for example, 1.2 times the length and the width) of the video frame on which object recognition needs to be performed; and extracting first feature point information after obtaining the grayscale image, and generating second feature point information. The first feature point information is used for determining whether a corresponding video frame matches the marker image in a subsequent video frame recognition process, and the first feature point information may be ORB information. The second feature point information is used for performing subsequent image tracking recognition. The second feature point information may be a corner feature of Good Features To Track (GFTT). A generated second feature point is a corner feature, and is suitable for subsequent optical flow tracking between video frames. Some or all feature points represented by second feature point information in a target marker image are determined as source feature points. In an embodiment, these source feature points may be feature points in a target object in the target marker image. The target marker image may have only one target object. For example, for a torch in FIG. 3, all extracted ORB points and GFTT points may be feature points on the torch, such as points on a pattern part of the torch, points at the top, and the like.

S302: Perform object recognition.

When feature point information of an extracted video frame is ORB information, object recognition is performed on the ORB information of the video frame and ORB information of the foregoing loaded marker images. If a marker image is determined to be associated with the video frame, subsequent steps may be performed from the video frame. In this embodiment, an $i^{th}$ video frame is recognized to be associated with a target marker image in the marker image. After the $i^{th}$ video frame is determined to be associated with the target marker image, an initial extrinsic parameter matrix of the image shooting apparatus is computed, and used for a subsequent operation of generating tracking points. The initial extrinsic parameter matrix is determined by an H matrix obtained through computation according to GFTT feature point information of the $i^{th}$ video frame and GFTT feature point information of the target marker image.

S303: Determine tracking points used for performing optical flow tracking.

When the object recognition operation in S302 is relatively time-consuming, the object recognition operation and the image shooting apparatus shooting a video are asynchronous operations. Therefore, after object recognition is performed on the $i^{th}$ video frame and the $i^{th}$ video frame is determined to be associated with the target marker image, the currently obtained video frame is a $j^{th}$ video frame posterior to several frames of the $i^{th}$ video frame. To determine feature point information on the $j^{th}$ video frame, tracking points on the $i^{th}$ frame need to be first determined based on the source feature points on the target marker image, and feature point information of the tracking points are obtained.

In an embodiment, as shown in FIG. 3, the $i^{th}$ video frame shot by the image shooting apparatus may be used as a scenario in which the torch used as the target object is placed on a fixing mechanism. In addition to the torch, the $i^{th}$ video frame further includes other objects such as a fixing apparatus. The tracking points found from the feature points in the target marker image refer to feature points related to the torch on the $i^{th}$ video frame.

Figure 4:
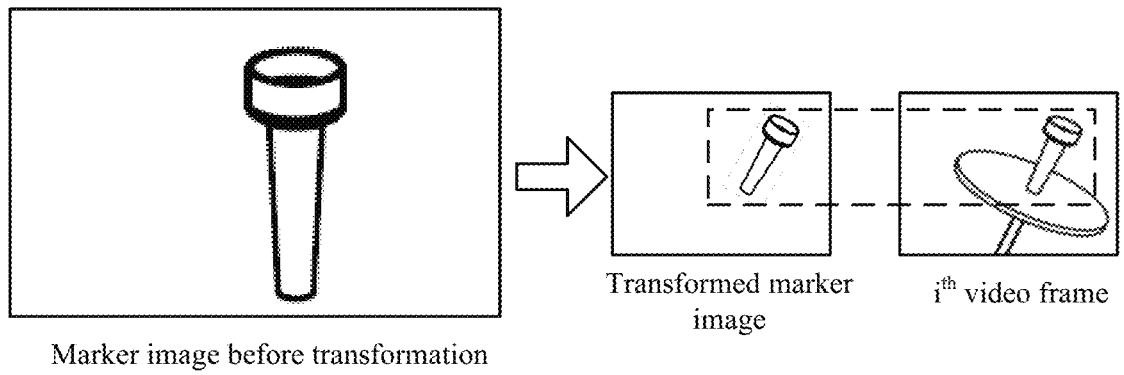
FIG. 4 is a schematic diagram of a relationship between a transformed marker image and a video frame in an embodiment.

In an embodiment, an H matrix between the target marker image and the $i^{th}$ video frame is obtained through computation by using a matching result of object recognition, that is, ORB information matching between the marker image and the $i^{th}$ video frame. Homogeneous transformation is performed on the target marker image by using the H matrix, and perspective transformation is performed on the target marker image on which the homogeneous transformation has been performed, to obtain a transformed marker image. The transformed target marker image is an image in the same size as the $i^{th}$ video frame, and an image position region of the target object in the transformed target marker image is the same as an image position region that is of a corresponding target object in the $i^{th}$ video frame and that is in the $i^{th}$ video frame, or due to a possible computational error of the H matrix, the image position region of the target object in the target marker image and the image position region of the target object in the $i^{th}$ video frame are actually close. A relationship among the marker image before the transformation, the transformed marker image, and the video frame is specifically shown in FIG. 4. After the homogeneous transformation and the perspective transformation, the target object in the target marker image may overlap the target object in the $i^{th}$ video frame. As shown in a dotted box in FIG. 4, an image position of the torch on the transformed marker image is almost the same or basically the same as an image position of the torch on the $i^{th}$ video frame.

In addition, the source feature points on the target marker image are transformed based on the H matrix between the target marker image and the $i^{th}$ video frame, to obtain image position coordinates corresponding to the source feature points in the transformed target marker image.

In an embodiment, the tracking points on the $i^{th}$ video frame may be determined according to the source feature points on the target marker image. By using a position coordinate of a source feature point on the transformed marker image as the center, an image in a 10*10 square region at a corresponding position region in the transformed marker image is intercepted as a template image. By using the same coordinate (target coordinate) as the center, an image in a 20*20 square region in the $i^{th}$ video frame is intercepted as a search window (search image). The search window is searched according to the template image. In a search process, a similarity between the template image and the search image is compared by using a Normalized Cross Correlation (NCC) algorithm. If the similarity is greater than 0.8, a point corresponding to the current target coordinate of the $i^{th}$ video frame is determined as a tracking point, and position information of the tracking point is used as feature point information of the $i^{th}$ video frame. Then, by using a position of a next source feature point as the center, the same search manner is performed, until a set quantity of tracking points is found, and feature point information of a set quantity of $i^{th}$ video frames is obtained. The feature point information of the i$^{th}$ video frame includes position information of the tracking points.

Search and detail comparison is performed within a search window range in a template matching manner. On one hand, impact brought by the computational error of the H matrix can be avoided. For example, the source feature points on the target marker image are computed based on the H matrix, to obtain the tracking points of the i$^{th}$ video frame. However, due to the error of the H matrix, the tracking points obtained through computation may not match the source feature points. On the other hand, feature points of a possible blocking part and a possible deformation part can be removed.

The foregoing involved size values and shapes are only examples. In other embodiments, regions in other sizes and other shapes may be alternatively intercepted. For example, a 5*10 rectangular region or a circular region with a radius of 10 may be intercepted. The size value uses a pixel point as a unit. For example, 10*10 refers to a position region of 10 pixel points*10 pixel points.

After the feature point information is determined on the i$^{th}$ video frame, for the j$^{th}$ video frame, feature points corresponding to the feature point information on the j$^{th}$ video frame may be tracked and recognized based on an inter-frame optical flow tracking algorithm.

S304: Perform inter-frame optical flow tracking processing.

On the basis of the i$^{th}$ video frame whose feature point information corresponding to the tracking points is determined, effective feature points are found on the j$^{th}$ video frame based on the optical flow tracking algorithm, a motion vector of points on an optical flow field between the i$^{th}$ video frame and the j$^{th}$ video frame, and positions of the tracking points on the i$^{th}$ video frame. These effective feature points are used as basic position points for performing image search on the j$^{th}$ video frame subsequently.

In an embodiment, the feature point information of the tracking points obtained on the i$^{th}$ video frame is first feature point information. On the i$^{th}$ video frame, the template image is intercepted by using a first feature point corresponding to the first feature point information as the center. On the j$^{th}$ video frame, the search image is intercepted by using the effective feature points obtained by performing optical flow tracking on the first feature point as the center. Image search is performed on the search image. When a sub-image whose similarity with the template image is greater than a preset similarity threshold is determined on the search image, the matched effective feature point is used as a second feature point. A next second feature point continues to be searched for, until a quantity of second feature points reaches a preset quantity threshold.

S305: Compute an H matrix.

Based on the first feature point information, a mapping relationship between the first feature point information and second feature point information corresponding to the second feature points, and a mapping relationship between the first feature point information and corresponding source feature point information, a mapping relationship between the second feature point information of the j$^{th}$ video frame and the source feature point information corresponding to the target marker image is constructed. Finally, the H matrix between the j$^{th}$ video frame and the target marker image is computed based on the mapping relationship between the second feature point information and the corresponding source feature point information.

Compared with the i$^{th}$ video frame, the j$^{th}$ video frame may be shot at a different position point and/or angle after the image shooting apparatus moves. As shown in FIG. 3, image positions of the torch and the fixing mechanism on the j$^{th}$ video frame are already different from image positions on the i$^{th}$ video frame. The second feature point information tracked on the j$^{th}$ video frame is obtained based on the tracking points of the i$^{th}$ video frame, and the tracking points of the i$^{th}$ video frame are obtained according to the source feature points on the target marker image. Therefore, the second feature point is related to the source feature point. Based on the mapping relationship between the second feature point information and the corresponding source feature point information, an H matrix between the j$^{th}$ video frame and the target marker image is computed. The H matrix can represent a relationship between the j$^{th}$ video frame and the target marker image.

S306: Obtain an extrinsic parameter matrix through computation.

The H matrix obtained through computation is processed to obtain an extrinsic parameter matrix. An extrinsic parameter matrix [r, t] of the image shooting apparatus may be obtained in a manner for processing the H matrix that is between the j$^{th}$ video frame and the target marker image and that is obtained computation. Based on the extrinsic parameter matrix and a known intrinsic parameter matrix of an image shooting apparatus, imaging processing is performed on the virtual content that needs to be superimposed on the target object, to image the virtual content in the video frame.

S307: Perform inter-frame optical flow tracking processing.

Because the second feature point information has been determined on the j$^{th}$ video frame, after a (j+1)$^{th}$ video frame is received, feature points corresponding to the second feature point information on the j$^{th}$ video frame may be used as tracking points, to perform optical flow tracking, and third feature point information corresponding to the (j+1)$^{th}$ video frame is further determined.

If a sufficient amount of third feature point information is determined on the (j+1)$^{th}$ frame successfully, subsequent processing may be performed based on the third feature point information, to help obtain an H matrix between the (j+1)$^{th}$ video frame and the target marker image, and determine an extrinsic parameter matrix obtained when the (j+1)$^{th}$ video frame is shot. If the amount of the determined third feature point information is insufficient, point supplementing processing of supplementing tracking points may be performed on the (j+1)$^{th}$ video frame.

In an embodiment, if a basic amount of third feature point information is not determined on the (j+1)$^{th}$ video frame successfully, for example, the amount of the determined third feature point information is less than N (for example, N=5), it may be regarded that environment switching has been performed on a current video shot by the image shooting apparatus. In this case, the foregoing S302 may be performed again, that is, object recognition and related processing are performed on the video frame again.

In an embodiment, when feature point information on the (j+1)$^{th}$ video frame is determined, the second feature point information may be regarded as the first feature point information, and feature point information on the (j+1)$^{th}$ video frame that needs to be determined is the second feature point information. For a determining manner for the feature point information on the (j+1)$^{th}$ video frame, reference may be made to the determining manner for performing search based on the template image and the search image in the foregoing S303.

In an embodiment, the (j+1)$^{th}$ video frame and the j$^{th}$ video frame are adjacent video frames, and an inter-frame spacing between the $(j+1)^{th}$ video frame and the $j^{th}$ video frame is less than an inter-frame spacing between the $j^{th}$ video frame and the $i^{th}$ video frame. Therefore, when search is performed on the $(j+1)^{th}$ video frame based on the template image and the search image, a search window corresponding to the search image may be a relatively small window. For example, if the template image still uses a 10*10 size, the search image correspondingly uses the 13*13 size. That is, corresponding feature points may be more quickly determined on the $(j+1)^{th}$ video frame, to further obtain feature point information, without the need of using a 20*20 large window.

In a process of determining the feature point information in a subsequent video frame by using optical flow tracking, for example, in a process of determining the first feature point information and the second feature point information, due to moving of the image shooting apparatus, a part of the target object in the video frame may be out of a camera shooting range, or a part of the target object may be blocked, which may cause fewer tracking points for performing optical flow tracking on the video frame. In this case, the tracking points need to be supplemented. For the tracking point supplementing step, refer to the description in S303. Specifically, new tracking points are determined in the target marker image and the current video frame with fewer optical flow tracking points, and an extrinsic parameter matrix obtained computation based on a previous frame is used. The feature points supplemented from the target marker image not only supplement the tracking points, but also can modify errors accumulated in the optical flow tracking process, and reduce impact on the H matrix computation, thereby modifying the extrinsic parameter matrix of the image shooting apparatus to some degree.

In an embodiment, if the amount of the feature point information determined on the $(j+1)^{th}$ video frame based on the optical flow tracking algorithm is small, feature point information of the tracking points may be supplemented on the $(j+1)^{th}$ video frame again based on the source feature points in the target marker image. For the manner used for supplementing, reference may be made to the description in S303. Specifically, new tracking points are supplemented on the $(j+1)^{th}$ video frame based on the source feature points of the target marker image, the template image determined on the target marker image, and the search image determined on the $(j+1)^{th}$ video frame.

S308: Compute an H matrix.

Based on a mapping relationship between the second feature point information and the third feature point information, and a mapping relationship between the second feature point information and the source feature point information of the target marker image, a mapping relationship between the third feature point information and the source feature point information is determined, and an H matrix between the $(j+1)^{th}$ video frame and target marker image may be constructed based on the mapping relationship between the third feature point information and the source feature point information.

S309: Obtain an extrinsic parameter matrix through computation.

The H matrix obtained through computation is processed to obtain the extrinsic parameter matrix. After the H matrix is processed, the extrinsic parameter matrix of the image shooting apparatus during shooting of the $(j+1)^{th}$ video frame may be obtained.

In an embodiment, to obtain a more smooth camera track, a sliding window policy may be used, and an extrinsic parameter matrix of all video frames in a sliding window are optimized by using a bundle optimizing manner, so that the extrinsic parameter matrix of the image shooting apparatus generates a smaller projection error. When a new video frame appears, the new video frame is replaced in an old video frame in the sliding window. That is, when a plurality of video frames is used to observe the same point in a scenario, an extrinsic parameter matrix corresponding to each video frame in the sliding window is used as a constraint condition. For the last video frame in the sliding window, not only the extrinsic parameter matrix needs to be obtained through computation based on the foregoing mentioned H matrix, but also it needs to consider that an extrinsic parameter matrix corresponding to former video frames in the sliding window is used as a constraint condition, to modify the extrinsic parameter matrix of the last video frame obtained through computation. In this way, an optimized method is used to minimize errors of the point projected on all frames, so that the extrinsic parameter matrix is more stable.

Figure 5A:
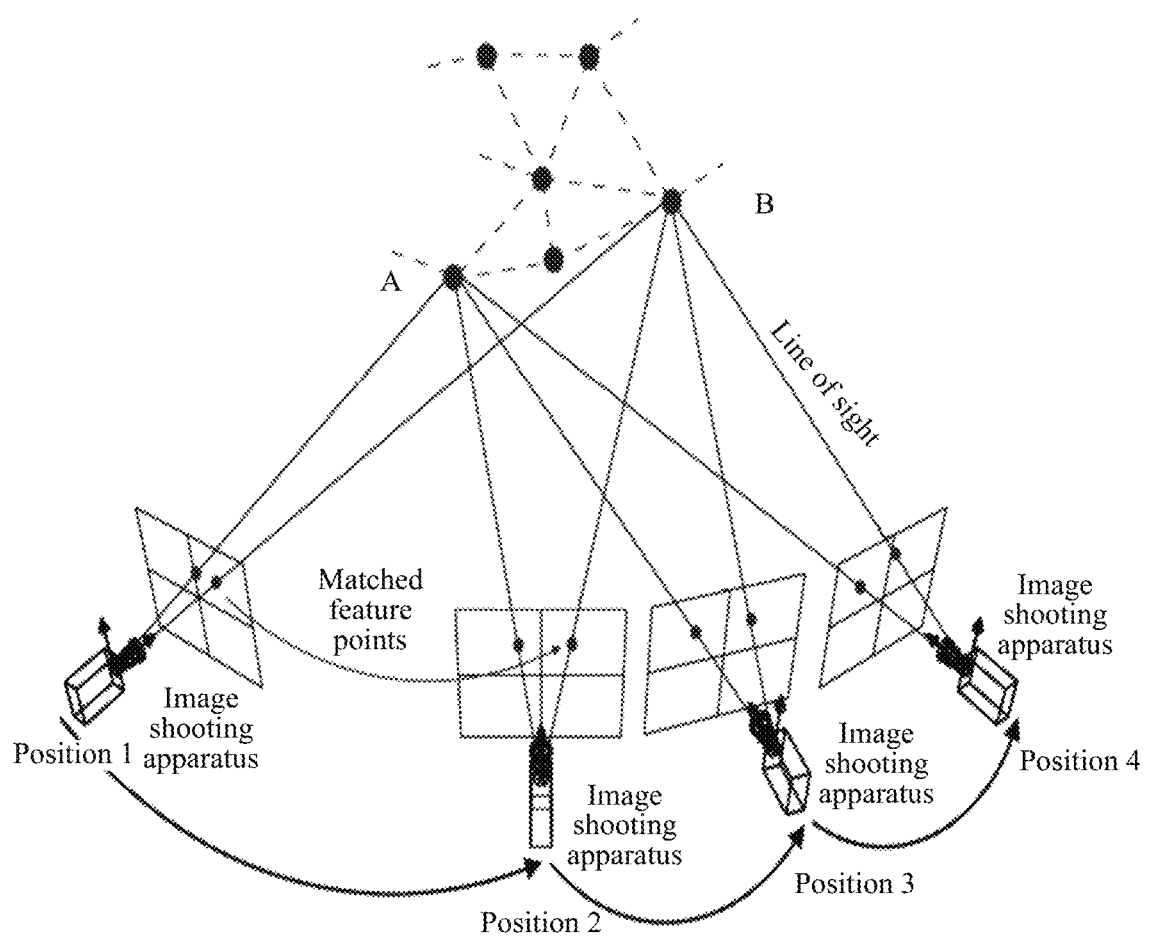
FIG. 5a is a schematic diagram of a shooting scenario in an embodiment.

In an embodiment, four video frames exist in the sliding window. As shown in FIG. 5a, for point A on a shot object, the image shooting apparatus shoots point A at four positions: position 1, position 2, position 3, and position 4 respectively, and four video frames exist. The H matrix and the extrinsic parameter matrix are obtained by computing each video frame based on the foregoing mentioned computing manner. The extrinsic parameter matrix obtained during shooting at the three positions position 1 to position 3 needs to be used to modify the extrinsic parameter matrix obtained by computing the fourth video frame shot at position 4, to obtain a more accurate extrinsic parameter matrix.

Figure 5B:
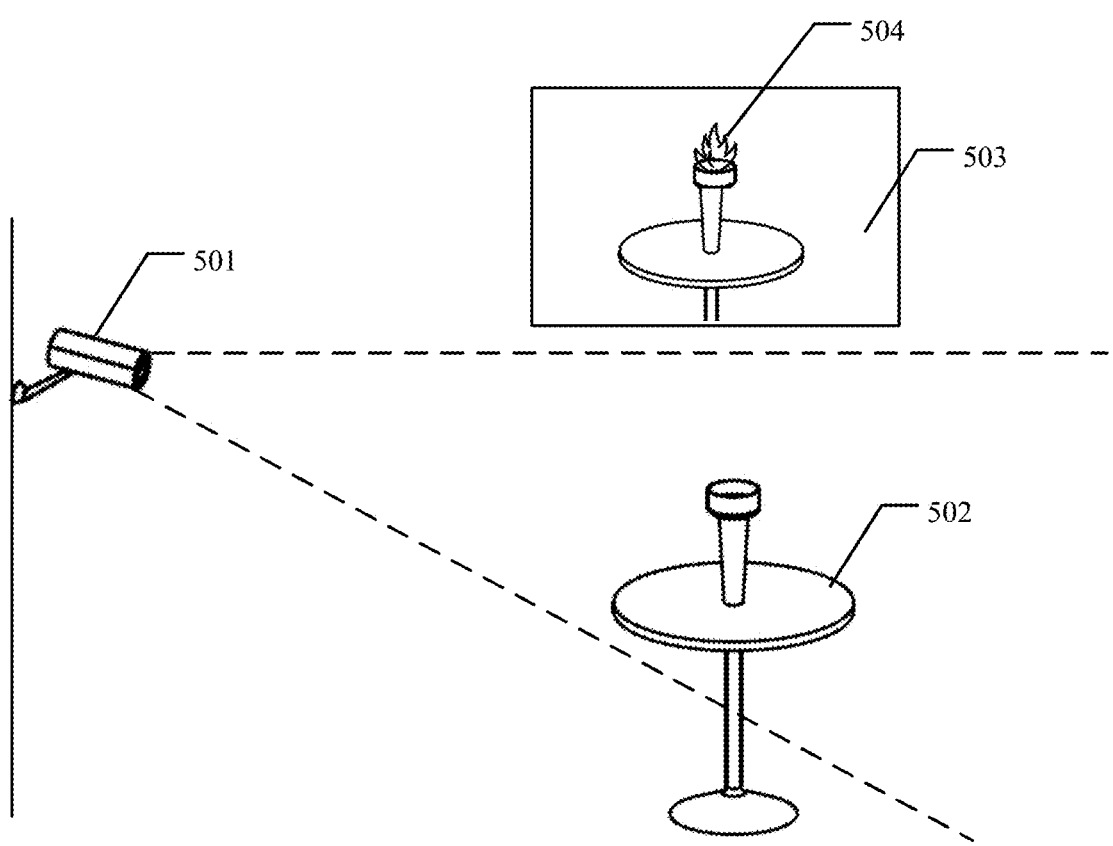
FIG. 5b is a schematic diagram of a specific application scenario in an embodiment.

In an embodiment, FIG. 5b is a schematic diagram of a specific application scenario. A real scenario 502 has a desktop and a torch placed on the desktop, and the torch has no flame. The image shooting apparatus 501 shoots the real scenario 502, to obtain the foregoing mentioned $i^{th}$ video frame, $j^{th}$ video frame, and $(j+1)^{th}$ video frame, and transmit these video frames to an AR device. The AR device performs the foregoing AR scenario processing based on these video frames, and presents video frames obtained after the AR processing to users on a display screen 503. On the AR image, a flame image 504 is a virtual image added on the corresponding video frame.

In an embodiment, when optical flow tracking is invalid due to quick moving of the image shooting apparatus or a dramatic change of illumination, for example, when sufficient feature point information cannot be determined based on the optical flow tracking algorithm, the algorithm may be regarded invalid. In this case, sensing data of another motion sensor device on a terminal may be obtained to determine a pose of the image shooting apparatus, to obtain a current extrinsic parameter matrix of the image shooting apparatus. For example, sensing data of an inertial measurement unit (IMU) is obtained to determine the pose of the image shooting apparatus. When the moving is invalid, a pose of the IMU may be used to provide a transient camera pose, which has stronger robustness for the dramatic moving.

After the extrinsic parameter matrix is obtained, imaging processing may be performed on an AR scenario based on the extrinsic parameter matrix. First, virtual content used for being superimposed on a target object of a target marker image is obtained; a superimposed position of the virtual content on the target object is determined; and the extrinsic parameter matrix is used to control the image shooting apparatus to perform shooting, and the virtual content is superimposed on a shot video frame according to the superimposed position. For example, the virtual content may be a flame image that needs to be superimposed on the torch, and the virtual content may be a preset image. The superimposed position is a position on the target object on which a user intends to superimpose the virtual content. For the torch, the user intends to superimpose the flame image on the top of the torch, and the superimposed position may be correspondingly regarded as a position region of the top of the torch of the target marker image. Then, shooting is performed according to the extrinsic parameter matrix obtained through computation. Because the target marker image corresponds to a world coordinate system, actually it is regarded that the position of the flame image as an entity object in the world coordinate system may be determined according to the superimposed position, and then, it may be obtained based on the extrinsic parameter matrix and the intrinsic parameter matrix that the flame image is at an image position of the shot video frame.

Figure 6:
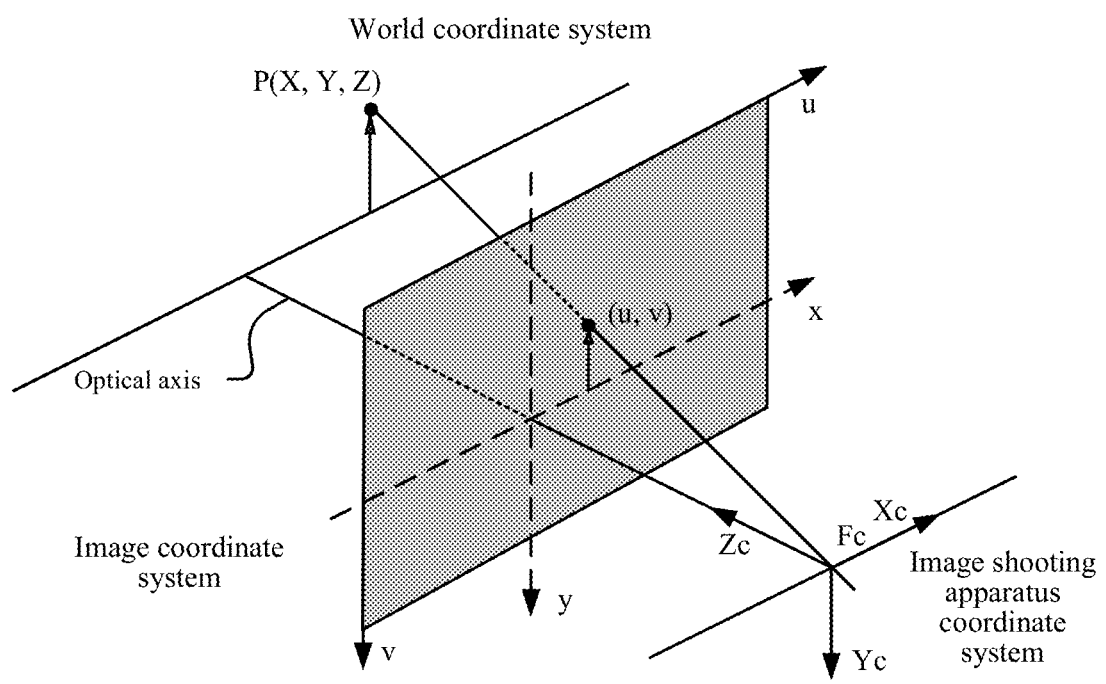
FIG. 6 is a schematic diagram of a coordinate position relationship in an embodiment.

Superimposing the virtual content on the $j^{th}$ video frame is used as an example. FIG. 6 shows a world coordinate system (X, Y, Z), an image coordinate system (u, v), and an image shooting apparatus coordinate system ($X_C$, $Y_C$, $Z_C$). Because the H matrix between the $j^{th}$ video frame and the target marker image is obtained through computation, the world coordinate system shown in FIG. 6 may be regarded as a coordinate system of a plane on which the target marker image is located, and feature points of the target object in the target marker image all have a coordinate point in the world coordinate system. When the virtual content needs to be superimposed on the target object, for example, when a virtual flame image is superimposed on an upper side of the torch, the virtual content may be regarded as an actual object. For example, P in FIG. 6 is regarded as a point on the actual object corresponding to the virtual content. Based on the current extrinsic parameter matrix, the object is imaged on the video frame, and is imaged at a corresponding position of the target object, for example, an upper region position of the torch. Because the position of the torch is known, and point P on the actual object corresponding to the virtual content that needs to be superimposed is also known, based on the world coordinate system (a planar coordinate system of the target marker image), the extrinsic parameter matrix and the intrinsic parameter matrix of the image shooting apparatus, and a position that needs to be imaged, a virtual flame may be imaged on the $j^{th}$ video frame, and presented to the user. For example, point P may be imaged as point P' on the video frame.

In addition, in the embodiments of this application, it is not simply determine the target object based on an image similarity between two video frames and further superimpose the virtual content. Instead, the target object is determined in a manner of solving an extrinsic parameter of a camera by using the optical flow tracking algorithm in combination with the homography matrix and the virtual content is superimposed on the target object. Because only some feature points need to be analyzed and compared, a target recognition time is greatly reduced, software and hardware resources are saved, and target recognition efficiency of the video frame is improved, so that the implementation of the AR scenario is quicker and more accurate.

Figure 7:
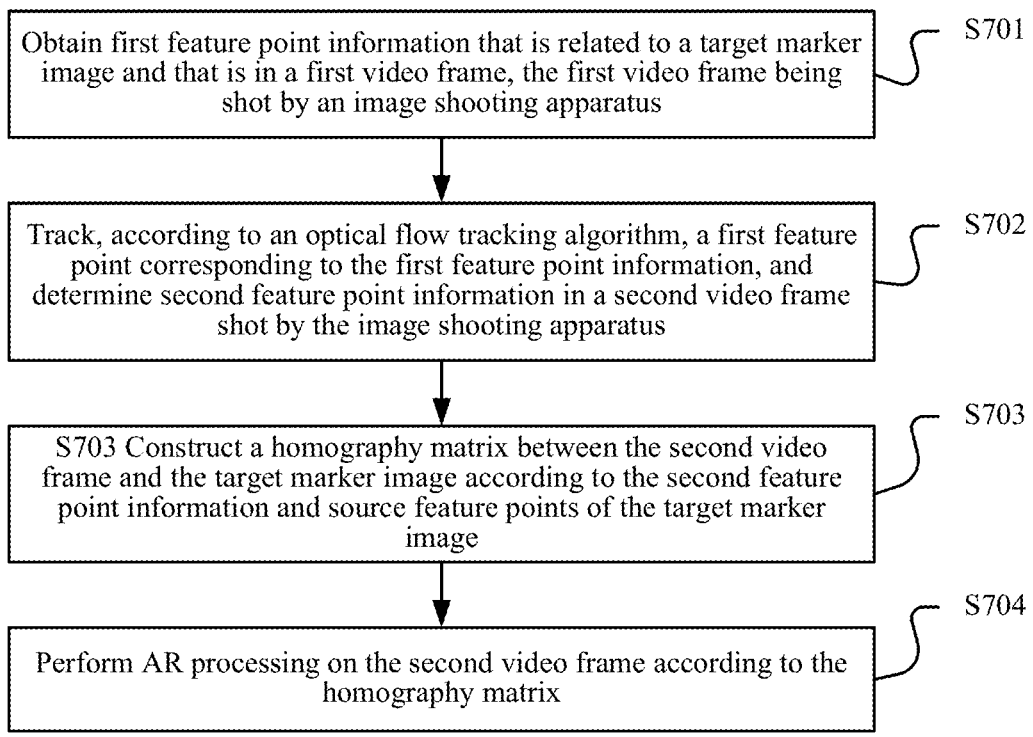
FIG. 7 is a schematic flowchart of an AR scenario processing method in an embodiment.

FIG. 7 is a schematic flowchart of an AR scenario processing method in an embodiment. The method may be performed by a smart device having an image analysis function. The smart device can receive video frames shot by an image shooting apparatus and perform object recognition on the video frames. In an embodiment, the method may be performed by a dedicated smart device or an AR device. The method may include the following step S701 to S704.

S701: Obtain first feature point information that is related to a target marker image and that is in a first video frame, the first video frame being shot by an image shooting apparatus.

The target marker image is a marker image determined from a marker image set. Whether the first video frame matches the marker image may be determined according to ORB information in the first video frame and ORB information in the marker image. In the embodiments of this application, if the first video frame matches the marker image, it may be regarded that both the first video frame and the target marker image include a target object. For the manner for determining the first feature point information on the first video frame, reference may be made to related description of determining tracking points on the $i^{th}$ video frame in the foregoing embodiments. Some or all first feature points may be used as tracking points, to help perform feature point tracking subsequently.

S702: Track, according to an optical flow tracking algorithm, a first feature point corresponding to the first feature point information, and determine second feature point information in a second video frame shot by the image shooting apparatus.

Both the first video frame and the second video frame are video frames shot by the image shooting apparatus, and the second video frame is shot after the first video frame is shot. In an embodiment, an optical flow field between the first video frame and the second video frame may be determined first, a position of the second feature point on the second video frame is determined roughly based on a motion vector of first feature points in the optical flow field, and image search is performed based on the determined position, to determine the second feature points on the second video frame, and determine position information of the second feature point on the second video frame as the second feature point information.

For the specific implementation of determining the second feature point information in step S702, reference may be made to the description of step S304 in the foregoing embodiment. Specifically, an effective feature point corresponding to a first feature point in the second video frame is determined by using an optical flow field, then a template image is determined by using the position of the first feature point in the first video frame, and a search image is determined by using a position of the corresponding effective feature point in the second video frame. Whether the effective feature point is the second feature point is determined in a manner of performing image search to determine a similarity. After second feature point information of second feature points with a quantity exceeding a preset quantity threshold quantity is obtained, the following S703 is performed.

S703: Construct a homography matrix between the second video frame and the target marker image according to the second feature point information and source feature points of the target marker image.

After feature point information matching between two video frames is determined, a mapping relationship between feature points of two video frames may be computed, and an H matrix determined according to the mapping relationship is the homography matrix. The specific manner for computing the homography matrix based on the mapping relationship between feature point information may be implemented by using an existing manner.

S704: Perform AR processing on the second video frame according to the homography matrix.

The homography matrix may be processed, an extrinsic parameter matrix of the image shooting apparatus during shooting of the second video frame is determined, and AR processing is performed on the second video frame based on the extrinsic parameter matrix.

In an embodiment, S704 may specifically include the following steps: obtaining an intrinsic parameter matrix of the image shooting apparatus; obtaining an original extrinsic parameter matrix of the image shooting apparatus through computation according to the homography matrix and the intrinsic parameter matrix during shooting of the second video frame; and modifying the original extrinsic parameter matrix according to the stored extrinsic parameter matrix, to obtain the extrinsic parameter matrix of the image shooting apparatus during shooting of the second video frame, where the stored extrinsic parameter matrix is an extrinsic parameter matrix used by the image shooting apparatus before the shooting of the second video frame. The modifying the original extrinsic parameter matrix according to the stored extrinsic parameter matrix is the foregoing mentioned optimizing an extrinsic parameter matrix of all video frames in a sliding window by using a bundle optimizing manner based on a sliding window policy. For details, reference may be made to the corresponding description in the embodiment corresponding to FIG. 5a above.

In an embodiment, for a camera imaging manner, reference may be made to the following formula:

$$x_p = K^*[r_1 r_2 r_3 t]^* X_w \qquad \text{formula 1}$$

where $X_w$ is a point in a world coordinate system, that is, a position point in an environment, $[r_1, r_2, r_3, t]$ represents the extrinsic parameter matrix of the image shooting apparatus, K represents the intrinsic parameter matrix of the image shooting apparatus, and point $X_p$ on a video frame may be obtained based on the three parameters.

Transformation may be performed based on the foregoing formula 1, to obtain the following formula 2.

$$x_p = K^*[r_1 r_2 t]^* X_w' \qquad \text{formula 2.}$$

Because the video frame is a plane, and the video frame is regarded to be on a plane xy of the world coordinate system, z is 0. The direction of r3 (z axis) is useless. Therefore, turn to formula 2 from formula 1.

In formula 2, $K^*[r_1 r_2 t]$ is correspondingly an H matrix. Therefore, the matrix $[r_1 r_2 t]$ may be obtained through computation according to the H matrix and the intrinsic parameter matrix K. Refer to the following formula 3.

$$K^{-1} * H = [r_1 r_2 t] \qquad \text{formula 3.}$$

In addition, the value of $r_3$ may be obtained by using the following formula 4.

$$r_3 = r_1 \cdot \text{cross}(r_2) \qquad \text{formula 4,}$$

where cross( ) refers to a vector cross-product.

With reference to formula 3 and formula 4, the extrinsic parameter matrix [r, t] of the image shooting apparatus may be obtained through computation.

Intrinsic parameters of the image shooting apparatus include parameters such as a focal length and pixels. Therefore, the intrinsic parameter matrix of the camera may be obtained according to parameters such as the focal length of the image shooting apparatus during shooting. After the H matrix between the video frame and the marker image is obtained through computation, the extrinsic parameter matrix may be obtained based on the foregoing formula 3 and formula 4.

In an embodiment, if scaling processing is performed on the video frame, appropriate modification may be performed by using the H matrix obtained through computation. In this case, the H matrix of the video frame is modified according to a scaling proportion, including normalizing pixel coordinates of the video frame to a length of a unit, that is, $M_{w2p}$ is multiplied. If the video frame is scaled, $M_s$ (scaling proportion) is multiplied. The modification manner is obtained according to the following formula 5 and formula 6.

$$M_s^* x_s = x_p = K^*[r_1 r_2 t]^* M_{w2p}^* X_p' \qquad \text{formula 5; and}$$

$$H' = k^{-1} * M_s^{-1} * H * M_{w2p}^{-1} \qquad \text{formula 6.}$$

H' is the modified H matrix, and H' is substituted into H in formula 3, to obtain a more accurate extrinsic parameter matrix of the image shooting apparatus with reference to formula 4.

The performing AR processing on the second video frame after obtaining the extrinsic parameter matrix includes: obtaining virtual content used for being superimposed on a target object of the target marker image; determining a superimposed position of the virtual content on the target object; and using the extrinsic parameter matrix to control the image shooting apparatus to perform shooting, and superimposing the virtual content on a shot video frame according to the superimposed position. For the manner for performing AR processing on the target object in the shot video frame based on the extrinsic parameter matrix, reference may be made to the related description of the embodiment of FIG. 6.

In addition, for the first video frame, because it has been determined that the target object exists in the first video frame, in an embodiment, AR processing also needs to be performed on the first video frame. First, an initial extrinsic parameter matrix used for shooting the first video frame is determined; and AR processing is performed on the first video frame according to the initial extrinsic parameter matrix. The initial extrinsic parameter matrix may be obtained through processing based on the H matrix between the first video frame and the target marker image. For the processing manner and the subsequent AR processing for the first video frame, reference may be made to the description of the related content above. Details are not described herein again.

In an embodiment, when optical flow tracking is invalid due to quick moving of the image shooting apparatus or a dramatic change of illumination, when second feature points meeting a quantity requirement cannot be determined in the second video frame, the extrinsic parameter matrix of the image shooting apparatus may be obtained through computation based on acquired motion sensing data about the image shooting apparatus, for example, IMU data. That is, in the process of performing the foregoing steps, whether an amount of the determined second feature point information is less than a second amount threshold is determined; if the amount is less than the second amount threshold, motion sensing data of the image shooting apparatus is obtained, and the extrinsic parameter matrix of the image shooting apparatus is determined according to the motion sensing data; and AR processing is performed on the shot video frame according to the determined extrinsic parameter matrix.

In the embodiments of this application, it is not simply determine the target object based on an image similarity between two video frames and further superimpose the virtual content. Instead, the target object is determined in a manner of solving an extrinsic parameter of a camera by using the optical flow tracking algorithm in combination with the homography matrix and the virtual content is superimposed on the target object. Because only some feature points need to be analyzed and compared, a target recognition time is greatly reduced, software and hardware resources are saved, and target recognition efficiency of the video frame is improved, so that the implementation of the AR scenario is quicker and more accurate.

Figure 8:
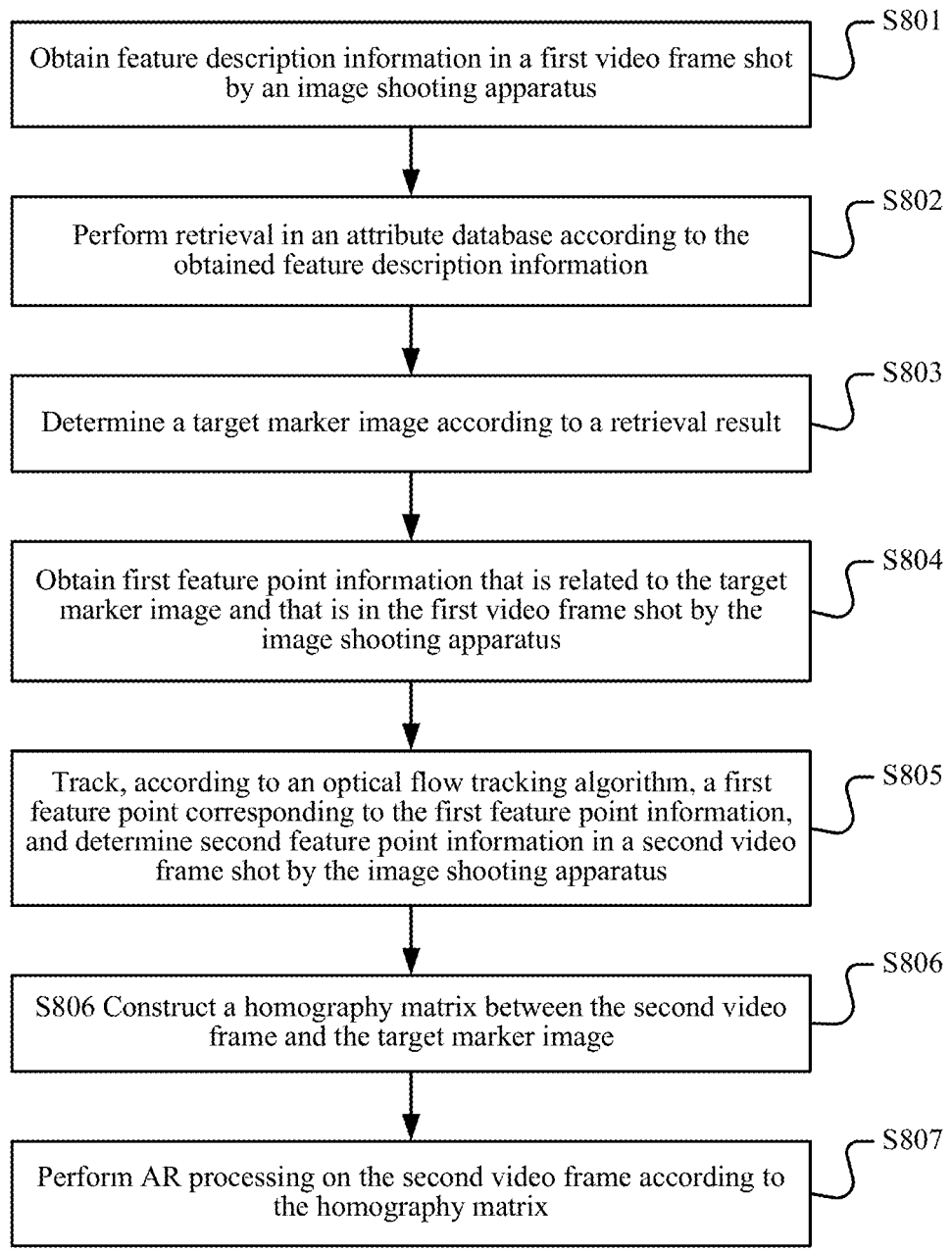
FIG. 8 is a schematic flowchart of an AR scenario processing method in an embodiment.

FIG. 8 is a schematic flowchart of an AR scenario processing method in an embodiment. Likewise, the method may be performed by a dedicated smart device or an AR device. The method includes the following steps S801 to S807.

S801: Obtain feature description information in a first video frame shot by an image shooting apparatus.

In an embodiment, ORB information is used as the feature description information. After a video frame shot by the image shooting apparatus is received, ORB information in the video frame may be extracted, and compared with ORB information of one or more marker images. Whether the video frame matches a marker image is determined according to a comparison result.

S802: Perform retrieval in an attribute database according to the obtained feature description information.

The information stored in the attribute database includes: feature description information respectively recorded for a plurality of configured marker images. In an embodiment, the attribute database stores information obtained after an index of ORB information of one or more marker images is constructed, ORB information of a marker image can be found quickly based on the attribute database and the index, and a similarity of ORB information between the video frame and the ORB information in the marker image is compared.

S803: Determine a target marker image according to a retrieval result.

A similarity between feature description information of N feature points of the target marker image and feature description information of corresponding N feature points of the first video frame meets a similarity condition, that is, there are at least N feature points for which the similarity of the feature description information between the target marker image and the first video frame is greater than a similarity threshold.

In an embodiment, a plurality of matching ORB point sets matching the ORB information of the first video frame is determined from the attribute database. Then, an optimal ORB point set is screened out according to a vector Hamming distance, an amount of ORB information whose similarity with the ORB information of the first video frame in a matching ORB point set is greater than a preset threshold, and a scoring result of the ORB information in the ORB point set. A marker image corresponding to the ORB point set is the target marker image.

S804: Obtain first feature point information that is related to the target marker image and that is in the first video frame shot by the image shooting apparatus.

In an embodiment, S804 may specifically include: obtaining an initial homography matrix between the first video frame shot by the image shooting apparatus and the target marker image; transforming the target marker image based on the initial homography matrix, to obtain a transformed target marker image; and determining a first feature point in the first video frame according to a position of a source feature point in the transformed target marker image, and obtaining position information of the first feature point in the first video frame, where the position information of the first feature point may be used as the first feature point information of the first video frame.

In an embodiment, the determining a first feature point in the first video frame according to a position of a source feature point in the transformed target marker image includes: determining a template image by using the position of the source feature point in the transformed target marker image; determining a search image by using a position of an initial feature point that is associated with the source feature point and that is in the first video frame; performing image search in the search image according to the template image; and using the initial feature point as the first feature point if a sub-image is found in the search image, where an image similarity between the sub-image and the template image is greater than a preset similarity threshold.

For the manner for determining the first feature point information in the first video frame, reference may be made to the related description of determining tracking point information on the $i^{th}$ video frame according to the template image of the target marker image and the search image on the $i^{th}$ video frame above.

Finally, the quantity of the obtained first feature points needs to be greater than the preset quantity threshold, so that it can be ensured that sufficient first feature points may be used as tracking points provided to subsequent video frames for tracking.

S805: Track, according to an optical flow tracking algorithm, a first feature point corresponding to the first feature point information, and determine second feature point information in a second video frame shot by the image shooting apparatus.

In an embodiment, S805 may specifically include: determining an optical flow field between the first video frame and the second video frame; determining an estimated position based on a motion vector of points on the optical flow field, and the position of the first feature point in the first video frame; determining a template image by using the position of the first feature point in the first video frame, and determining a search image by using the position of the estimated position in the second video frame; performing image search in the search image according to the template image; and determining a point corresponding to the estimated position as a second feature point if finding a sub-image on the search image, and determining the estimated position as the second feature point information, where an image similarity between the sub-image and the template image is greater than the preset similarity threshold.

In an embodiment, in both step S804 and S805, the feature point information may be determined in the manner of setting the template image and the search image. The size of the search image set on the second video frame in step S805 is less than the size of the search image set on the first video frame in step S804.

For the manner for determining the second feature point on the second video frame based on the estimated position of the tracking point after optical flow tracking is performed on the first video frame, reference may be made to the description of related content of determining feature point information on the $i^{th}$ video frame based on points on the $i^{th}$ video frame, or determining feature point information on the $(j+1)^{th}$ frame based on points on the $i^{th}$ video frame above.

In an embodiment, the amount of the determined second feature point information is greater than a preset amount threshold, and after a plurality of pieces of second feature point information is obtained, supplementing processing may be further performed. In an embodiment, the performing point supplementing processing includes: determining whether an amount of the determined second feature point information is less than an amount threshold; determining a new source feature point from the target marker image if the amount of the determined second feature point information is less than the amount threshold; and determining a new second feature point from the second video frame according to a position of the new source feature point in the transformed target marker image, to obtain position information of the new second feature point in the second video frame. Based on the point supplementing processing, a mapping relationship between second feature point information of second feature points supplemented on the second video frame and source feature point information of the target marker image can be established directly.

S806: Construct a homography matrix between the second video frame and the target marker image, where the homography matrix is constructed according to the second feature point information and source feature points of the target marker image. The homography matrix may be the foregoing H matrix.

S807: Perform AR processing on the second video frame according to the homography matrix. The homography matrix may be processed to obtain an extrinsic parameter matrix of the image shooting apparatus, and AR processing is performed on the second video frame based on the extrinsic parameter matrix.

In the embodiments of this application, it is not simply determine the target object based on an image similarity between two video frames and further superimpose the virtual content. Instead, the target object is determined in a manner of solving an extrinsic parameter of a camera by using the optical flow tracking algorithm in combination with the homography matrix and the virtual content is superimposed on the target object. Because only some feature points need to be analyzed and compared, a target recognition time is greatly reduced, software and hardware resources are saved, and target recognition efficiency of the video frame is improved, so that the implementation of the AR scenario is quicker and more accurate.

Figure 9:
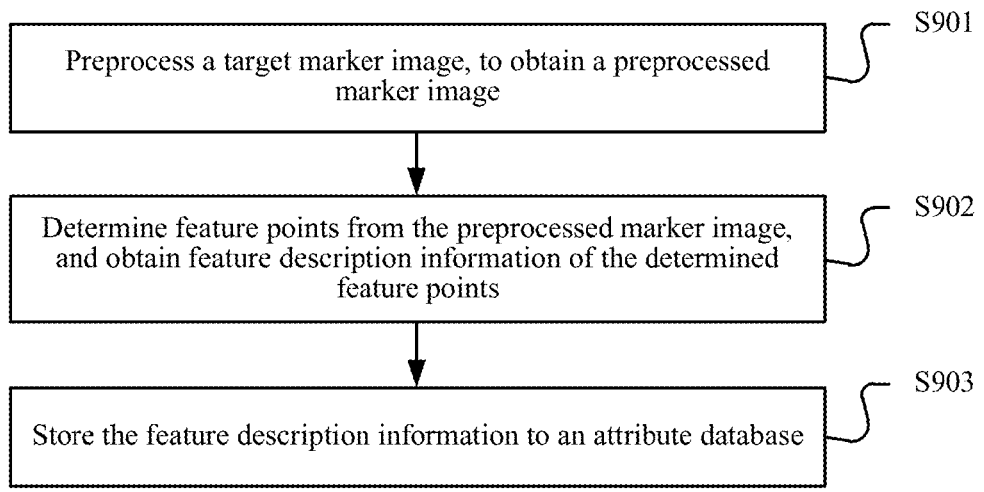
FIG. 9 is a schematic flowchart of a method for setting an attribute database in an embodiment.

FIG. 9 is a schematic flowchart of a method for setting an attribute database in an embodiment. The method is used for configuring the attribute database mentioned in S602 in the foregoing embodiment. The method includes the following steps:

S901: Preprocess a target marker image, to obtain a preprocessed marker image, where an image size of the preprocessed marker image is greater than that of a first video frame, and the preprocessed marker image is a grayscale image. The preprocessing helps determine feature points from the target marker image, and especially helps determine ORB information corresponding to ORB points.

S902: Determine feature points from the preprocessed marker image, and obtain feature description information of the determined feature points. The feature points of the marker image are ORB points, and the feature description information of the feature points is ORB information. Certainly, the feature description information may also be other information that can describe corresponding feature points on the preprocessed marker image.

S903: Store the feature description information to an attribute database. In an embodiment, after an index is constructed for the feature description information, the feature description information for which the index is constructed is stored to the attribute database. An index may be established for the ORB information by using an LSH algorithm and stored to a pre-configured attribute database.

In the embodiments of this application, it is not simply determine the target object based on an image similarity between two video frames and further superimpose the virtual content. Instead, the target object is determined in a manner of solving an extrinsic parameter of a camera by using the optical flow tracking algorithm in combination with the homography matrix and the virtual content is superimposed on the target object. Because only some feature points need to be analyzed and compared, a target recognition time is greatly reduced, software and hardware resources are saved, and target recognition efficiency of the video frame is improved, so that the implementation of the AR scenario is quicker and more accurate.

Figure 10:
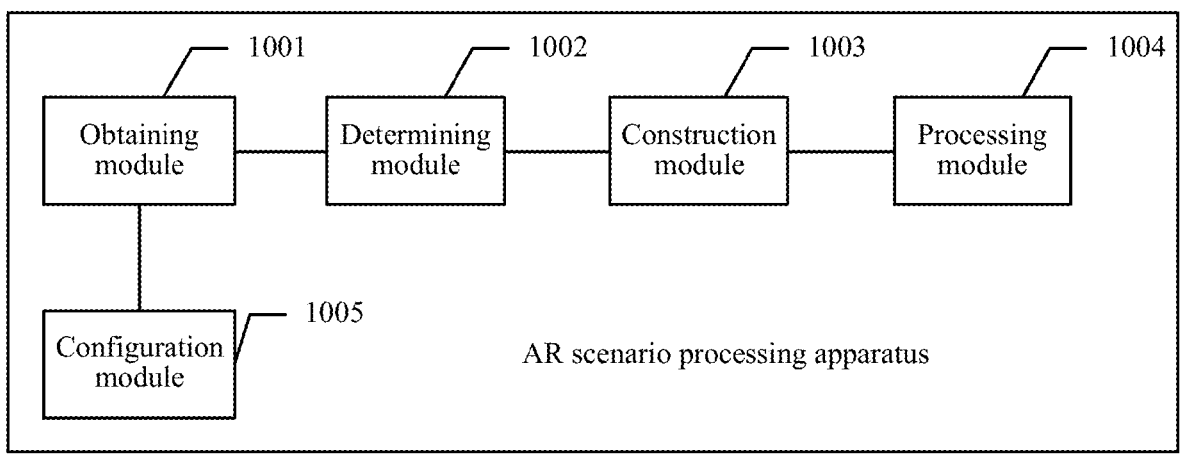
FIG. 10 is a schematic structural diagram of an AR scenario processing apparatus in an embodiment.

FIG. 10 is a schematic structural diagram of an AR scenario processing apparatus in an embodiment. The apparatus may be disposed in a smart device, for example, may be disposed in a smart AR device. The apparatus includes an obtaining module 1001, a determining module 1002, a construction module 1003, and a processing module 1004.

The obtaining module 1001 is configured to obtain first feature point information that is related to a target marker image and that is in a first video frame, the first video frame being shot by an image shooting apparatus.

The determining module 1002 is configured to track, according to an optical flow tracking algorithm, a first feature point corresponding to the first feature point information, and determine second feature point information in a second video frame shot by the image shooting apparatus.

The construction module 1003 is configured to construct a homography matrix between the second video frame and the target marker image according to the second feature point information and source feature points of the target marker image.

The processing module 1004 is configured to perform AR processing on the second video frame according to the homography matrix.

In an embodiment, the processing module 1004 is configured to process the homography matrix, and determine an extrinsic parameter matrix of the image shooting apparatus when during shooting the second video frame; and perform AR processing on the second video frame based on the extrinsic parameter matrix.

In an embodiment, the apparatus further includes: a marker determining module 1002, configured to: obtain feature description information in a first video frame shot by an image shooting apparatus; perform retrieval in an attribute database according to the obtained feature description information; and determine a target marker image according to a retrieval result, where a similarity between feature description information of N feature points of the target marker image and feature description information of N feature points corresponding to the first video frame meets a similarity condition.

In an embodiment, the obtaining module 1001 is configured to: obtain an initial homography matrix between the first video frame shot by the image shooting apparatus and the target marker image; transform the target marker image based on the initial homography matrix, to obtain a transformed target marker image; and determine a first feature point in the first video frame according to a position of a source feature point in the transformed target marker image, and obtain position information of the first feature point in the first video frame.

In an embodiment, the obtaining module 1001 is configured to: determine a template image by using the position of the source feature point in the transformed target marker image; determine a search image by using a position of an initial feature point that is associated with the source feature point and that is in the first video frame; perform image search in the search image of the first video frame according to the template image of the target marker image; and use the initial feature point as the first feature point if a sub-image is found in the search image of the first video frame, where an image similarity between the sub-image and the template image is greater than a preset similarity threshold.

In an embodiment, the determining module 1002 is configured to: determine an optical flow field between the first video frame and the second video frame; determine an estimated position based on a motion vector of points on the optical flow field, and the position of the first feature point in the first video frame; determine a template image by using the position of the first feature point in the first video frame, and determine a search image by using the position of the estimated position in the second video frame; perform image search in the search image of the second video frame according to the template image in the first video frame; and determine a point corresponding to the estimated position as a second feature point if a sub-image is found on the search image of the second video frame, and determine the estimated position as the second feature point information, where an image similarity between the sub-image and the template image is greater than a preset similarity threshold.

In an embodiment, the apparatus may further include: a configuration module 1005, configured to: preprocess a target marker image, to obtain a preprocessed marker image, where an image size of the preprocessed marker image is greater than that of the first video frame, and the preprocessed marker image is a grayscale image; determine feature points from the preprocessed marker image, and obtain feature description information of the determined feature points; and store the feature description information to the attribute database.

In an embodiment, the determining module 1002 is further configured to: determine whether an amount of the determined second feature point information is less than an amount threshold; determine a new source feature point from the target marker image if the amount of the determined second feature point information is less than the amount threshold; and determine a new second feature point from the second video frame according to a position of the new source feature point in the transformed target marker image, to obtain position information of the new second feature point in the second video frame.

In an embodiment, the processing module 1004 is configured to: obtain virtual content used for being superimposed on a target object of the target marker image; determine a superimposed position of the virtual content on the target object; and use the extrinsic parameter matrix to control the image shooting apparatus to perform shooting, and superimpose the virtual content on a shot video frame according to the superimposed position.

In an embodiment, the processing module 1004 is further configured to: determine an initial extrinsic parameter matrix used for shooting the first video frame; and perform AR processing on the first video frame according to the initial extrinsic parameter matrix.

In an embodiment, the processing module 1004 is configured to: obtain an intrinsic parameter matrix of the image shooting apparatus; obtain an original extrinsic parameter matrix of the image shooting apparatus through computation according to the homography matrix and the intrinsic parameter matrix during shooting of the second video frame; and modify the original extrinsic parameter matrix according to the stored extrinsic parameter matrix, to obtain the extrinsic parameter matrix of the image shooting apparatus during shooting of the second video frame, where the stored extrinsic parameter matrix is an extrinsic parameter matrix used by the image shooting apparatus before the shooting of the second video frame.

For specific implementation of modules in the apparatus according to this embodiment of the present disclosure, reference may be made to description of related content in the foregoing embodiments. Details are not described herein.

In the embodiments of this application, it is not simply determine the target object based on an image similarity between two video frames and further superimpose the virtual content. Instead, the target object is determined in a manner of solving an extrinsic parameter of a camera by using the optical flow tracking algorithm in combination with the homography matrix and the virtual content is superimposed on the target object. Because only some feature points need to be analyzed and compared, a target recognition time is greatly reduced, software and hardware resources are saved, and target recognition efficiency of the video frame is improved, so that the implementation of the AR scenario is quicker and more accurate.

Figure 11:
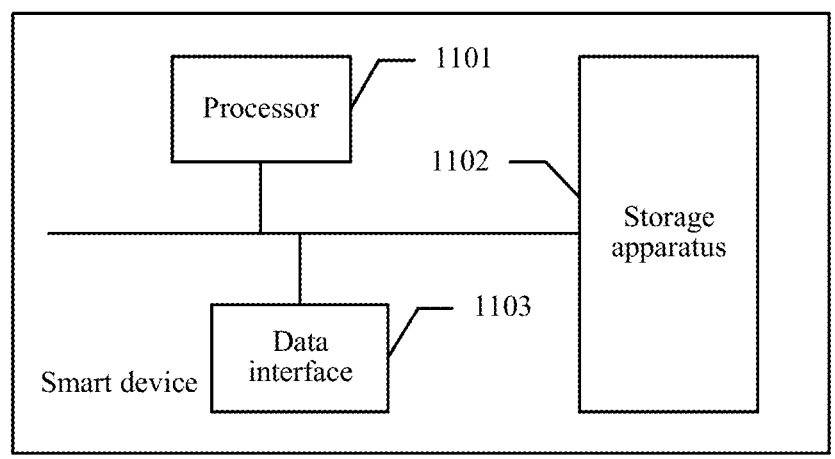
FIG. 11 is a schematic structural diagram of a smart device in an embodiment.

FIG. 11 is a schematic structural diagram of a smart device in an embodiment. The smart device includes structures such as a power supply module and a housing. The embodiments of this application further include: a processor 1101, a storage apparatus 1102, and a data interface 1103.

The storage apparatus 1102 may include a volatile memory, for example, a random access memory (RAM). The storage apparatus 1102 may also include a non-volatile memory, for example, a flash memory, a solid-state drive (SSD), and the like. The storage apparatus 1102 may further include a combination of the foregoing types of memories.

The processor 1101 may be processing circuitry such as a central processing unit (CPU). The processor 1101 may further include a hardware chip. The hardware chip may be an application-specific integrated circuit (ASIC), a programmable logic device (PLD), or the like. The PLD may be a field-programmable gate array (FPGA), a generic array logic (GAL), or the like.

In some embodiments, the storage apparatus 1102 is further configured to store program instructions. The processor 1101 may invoke the program instructions, to implement the AR scenario processing method provided in the embodiments of this application.

In an embodiment, the processor 1101 invokes the computer program instructions stored in the storage apparatus 1102, to perform the following steps: obtaining first feature point information that is related to a target marker image and that is in a first video frame, the first video frame being shot by an image shooting apparatus; tracking, according to an optical flow tracking algorithm, a first feature point corresponding to the first feature point information, and determining second feature point information in a second video frame shot by the image shooting apparatus; constructing a homography matrix between the second video frame and the target marker image according to the second feature point information and source feature points of the target marker image; and performing AR processing on the second video frame according to the homography matrix.

In an embodiment, when being configured to determine the image position of the target object of the marker image in the second video frame according to the homography matrix, the processor 1101 is configured to: process the homography matrix, and determine an extrinsic parameter matrix of the image shooting apparatus during shooting of the second video frame; and perform AR processing on the second video frame based on the extrinsic parameter matrix.

In an embodiment, before being configured to obtain the first feature point information that is related to the marker image and that is in the first video frame shot by the image shooting apparatus, the processor 1101 is further configured to: obtain feature description information in the first video frame shot by the image shooting apparatus; perform retrieval in an attribute database according to the obtained feature description information; and determine a target marker image according to a retrieval result, where a similarity between feature description information of N feature points of the target marker image and feature description information of N feature points corresponding to the first video frame meets a similarity condition.

In an embodiment, when being configured to obtain the first feature point information that is related to the marker image and that is in the first video frame shot by the image shooting apparatus, the processor 1101 is configured to: obtain an initial homography matrix between the first video frame shot by the image shooting apparatus and the target marker image; transform the target marker image based on the initial homography matrix, to obtain a transformed target marker image; and determine a first feature point in the first video frame according to a position of a source feature point in the transformed target marker image, and obtain position information of the first feature point in the first video frame.

In an embodiment, when being configured to determine the first feature point in the first video frame according to the position of a source feature point in the transformed target marker image, the processor 1101 is configured to: determine a template image by using the position of the source feature point in the transformed target marker image; determine a search image by using a position of an initial feature point that is associated with the source feature point and that is in the first video frame; perform image search in the search image of the first video frame according to the template image of the target marker image; and use the initial feature point as the first feature point if a sub-image is found in the search image of the first video frame, where an image similarity between the sub-image and the template image is greater than a preset similarity threshold.

In an embodiment, when being configured to track, according to the optical flow tracking algorithm, the first feature point corresponding to the first feature point information, and determine the second feature point information in the second video frame shot by the image shooting apparatus, the processor 1101 is configured to: determine an optical flow field between the first video frame and the second video frame; determine an estimated position based on a motion vector of points on the optical flow field, and the position of the first feature point in the first video frame; determine a template image by using the position of the first feature point in the first video frame, and determine a search image by using the position of the estimated position in the second video frame; perform image search in the search image of the second video frame according to the template image in the first video frame; and determine a point corresponding to the estimated position as a second feature point if a sub-image is found on the search image of the second video frame, and determine the estimated position as the second feature point information, where an image similarity between the sub-image and the template image is greater than a preset similarity threshold.

In an embodiment, before being configured to obtain the feature point attribute information in the first video frame shot by the image shooting apparatus, the processor 1101 is further configured to: preprocess a target marker image, to obtain a preprocessed marker image, where an image size of the preprocessed marker image is greater than that of the first video frame, and the preprocessed marker image is a grayscale image; determine feature points from the preprocessed marker image, and obtain feature description information of the determined feature points; and store the feature description information to the attribute database.

In an embodiment, after being configured to determine, according to the tracking result, the second feature point information in the second video frame shot by the image shooting apparatus, the processor 1101 is configured to: determine whether an amount of the determined second feature point information is less than an amount threshold; determine a new source feature point from the target marker image if the amount of the determined second feature point information is less than the amount threshold; and determine a new second feature point from the second video frame according to a position of the new source feature point in the transformed target marker image, to obtain position information of the new second feature point in the second video frame.

In an embodiment, when being configured to perform AR processing on the second video frame based on the extrinsic parameter matrix, the processor 1101 is configured to: obtain virtual content used for being superimposed on a target object of the target marker image; determine a superimposed position of the virtual content on the target object; and use the extrinsic parameter matrix to control the image shooting apparatus to perform shooting, and superimpose the virtual content on a shot video frame according to the superimposed position.

In an embodiment, before being configured to obtain the first feature point information that is related to the target marker image and that is in the first video frame shot by the image shooting apparatus, the processor 1101 is further configured to: determine an initial extrinsic parameter matrix used for shooting the first video frame; and perform AR processing on the first video frame according to the initial extrinsic parameter matrix.

In an embodiment, when being configured to determine the image position of the target object of the marker image in the second video frame according to the homography matrix, the processor 1101 is configured to: obtain an intrinsic parameter matrix of the image shooting apparatus; obtain an original extrinsic parameter matrix of the image shooting apparatus through computation according to the homography matrix and the intrinsic parameter matrix during shooting of the second video frame; and modify the original extrinsic parameter matrix according to the stored extrinsic parameter matrix, to obtain the extrinsic parameter matrix of the image shooting apparatus during shooting of the second video frame, where the stored extrinsic parameter matrix is an extrinsic parameter matrix used by the image shooting apparatus before the shooting of the second video frame.

For specific implementation of the processor according to this embodiment of the present disclosure, reference may be made to description of related content in the foregoing embodiments. Details are not described herein.

In the embodiments of this application, it is not simply determine the target object based on an image similarity between two video frames and further superimpose the virtual content. Instead, the target object is determined in a manner of solving an extrinsic parameter of a camera by using the optical flow tracking algorithm in combination with the homography matrix and the virtual content is superimposed on the target object. Because only some feature points need to be analyzed and compared, a target recognition time is greatly reduced, software and hardware resources are saved, and target recognition efficiency of the video frame is improved, so that the implementation of the AR scenario is quicker and more accurate.

In an embodiment, a computer storage medium is further provided. The computer storage medium stores a computer program, and when executed by a processor, the computer program implements the method described in any embodiment of this application.

A person of ordinary skill in the art may understand that all or some of the processes of the methods in the embodiments may be implemented by a computer program instructing relevant hardware. The program may be stored in a computer readable storage medium. When the program is run, the processes of the embodiments of the foregoing methods may be included. The foregoing storage medium may be non-transitory computer-readable medium such as a magnetic disk, an optical disc, a read-only memory (ROM), or a random access memory (RAM).

The foregoing discloses only some embodiments of the present disclosure, which certainly cannot be used to limit the rights scope of the present disclosure. A person of ordinary skill in the art may understand that all or some processes for implementing the foregoing embodiments, and equivalent change made according to the claims of the present disclosure shall still fall within the scope of the present disclosure.

What is claimed is:

1. An augmented reality (AR) scenario processing method, comprising:
   obtaining, by processing circuitry of an apparatus, first feature point information in a first video frame by performing object recognition to recognize a target object within the first video frame, the target object being included in a target marker image that is retrieved from an attribute database;
   tracking, by the processing circuitry and according to an optical flow tracking algorithm, a first feature point corresponding to the first feature point information;
   determining, by the processing circuitry, second feature point information in a second video frame according to the tracked first feature point and a first image similarity between a part of a first search region in the second video frame and a first template region in the first video frame being greater than a first preset similarity threshold;
   constructing, by the processing circuitry, a homography matrix between the second video frame and the target marker image according to the second feature point information and a first source feature point of the target marker image; and
   performing, by the processing circuitry, a first AR processing on the second video frame according to the homography matrix.

2. The method according to claim 1, further comprising:
   before the obtaining the first feature point information,
   obtaining, by the processing circuitry, first feature description information of the first video frame; and
   retrieving, by the processing circuitry, the target marker image from the attribute database according to the first feature description information.

3. The method according to claim 2, further comprising:
   before the obtaining the first feature description information of the first video frame,
   obtaining, by the processing circuitry, a preprocessed marker image by preprocessing the target marker image, an image size of the preprocessed marker image being greater than an image size of the first video frame, and the preprocessed marker image being a grayscale image;
   determining, by the processing circuitry, second feature description information of the preprocessed marker image; and
   storing, by the processing circuitry, the second feature description information into the attribute database in association with the target marker image.

4. The method according to claim 1, wherein the obtaining the first feature point information comprises:
   obtaining, by the processing circuitry, an initial homography matrix between the first video frame and the target marker image;
   transforming, by the processing circuitry, the target marker image into a transformed target marker image based on the initial homography matrix, the first source feature point of the target marker image being transformed into a first transformed source feature point in the transformed target marker image;
   determining, by the processing circuitry, the first feature point in the first video frame according to a position of the first transformed source feature point in the transformed target marker image; and
   obtaining, by the processing circuitry, position information of the first feature point in the first video frame.

5. The method according to claim 4, wherein the determining the first feature point in the first video frame comprises:
   determining, by the processing circuitry, a second template region in the transformed target marker image according to the position of the first transformed source feature point in the transformed target marker image;
   determining, by the processing circuitry, a second search region in the first video frame according to a position of an initial feature point that is associated with the first transformed source feature point and that is in the first video frame;
   performing, by the processing circuitry, image search in the second search region according to the second template region; and
   determining, by the processing circuitry, the first feature point according to the initial feature point when a second image similarity between a part of the second search region and the second template region is greater than a second preset similarity threshold.

6. The method according to claim 4, further comprising:
   after the determining the second feature point information,
   determining, by the processing circuitry, whether an information amount of the second feature point information is less than an amount threshold;
   determining, by the processing circuitry, a second source feature point in the target marker image when the information amount of the second feature point information is determined to be less than the amount threshold, the second source feature point being transformed into a second transformed source feature point in the transformed target marker image; and
   determining, by the processing circuitry, additional second feature point information in the second video frame according to a position of the second transformed source feature point in the transformed target marker image.

7. The method according to claim 1, wherein
the tracking the first feature point includes
determining, by the processing circuitry, an optical flow field between the first video frame and the second video frame; and
the determining the second feature point information includes
determining, by the processing circuitry, an estimated position in the second video frame based on a motion vector for the first feature point in the optical flow field and a position of the first feature point in the first video frame,
determining, by the processing circuitry, the first template region in the first video frame according to the position of the first feature point in the first video frame,
determining, by the processing circuitry, the first search region in the second video frame according to the estimated position in the second video frame,
performing, by the processing circuitry, image search in the first search region according to the first template region, and
determining, by the processing circuitry, the second feature point information according to the estimated position when the first image similarity between the part of the first search region and the first template region is greater than the first preset similarity threshold.

8. The method according to claim 1, wherein the performing the first AR processing further comprises:
determining, by the processing circuitry, a first extrinsic parameter matrix of the apparatus according to the homography matrix when the second video frame is captured by the apparatus; and
performing, by the processing circuitry, the first AR processing on the second video frame based on the first extrinsic parameter matrix.

9. The method according to claim 8, wherein the determining the first extrinsic parameter matrix further comprises:
obtaining, by the processing circuitry, an intrinsic parameter matrix of the apparatus; and
determining, by the processing circuitry, the first extrinsic parameter matrix of the apparatus according to the intrinsic parameter matrix, the homography matrix, and a second extrinsic parameter matrix for the first video frame or another video frame captured before the second video frame.

10. The method according to claim 8, wherein the performing the first AR processing on the second video frame further comprises:
obtaining, by the processing circuitry, virtual content for the target object of the target marker image;
determining, by the processing circuitry, a superimposed position of the virtual content on the target object; and
superimposing, by the processing circuitry, the virtual content on the second video frame according to the superimposed position.

11. The method according to claim 1, further comprising:
before the obtaining the first feature point information,
determining, by the processing circuitry, a third extrinsic parameter matrix for the first video frame; and performing, by the processing circuitry, a second AR processing on the first video frame according to the third extrinsic parameter matrix.

12. An apparatus, comprising processing circuitry configured to:
obtain first feature point information in a first video frame by performing object recognition to recognize a target object within the first video frame, the target object being included in a target marker image that is retrieved from an attribute database;
track, according to an optical flow tracking algorithm, a first feature point corresponding to the first feature point information;
determine second feature point information in a second video frame according to the tracked first feature point and a first image similarity between a part of a first search region in the second video frame and a first template region in the first video frame being greater than a first preset similarity threshold;
construct a homography matrix between the second video frame and the target marker image according to the second feature point information and a first source feature point of the target marker image; and
perform a first AR processing on the second video frame according to the homography matrix.

13. The apparatus according to claim 12, wherein the processing circuitry is further configured to:
before the obtain the first feature point information,
obtain first feature description information of the first video frame; and
retrieve the target marker image from the attribute database according to the first feature description information.

14. The apparatus according to claim 13, wherein the processing circuitry is further configured to:
before the obtain the first feature description information of the first video frame,
obtain a preprocessed marker image by preprocessing the target marker image, an image size of the preprocessed marker image being greater than an image size of the first video frame, and the preprocessed marker image being a grayscale image;
determine second feature description information of the preprocessed marker image; and
store the second feature description information into the attribute database in association with the target marker image.

15. The apparatus according to claim 12, wherein the processing circuitry is further configured to:
obtain an initial homography matrix between the first video frame and the target marker image;
transform the target marker image into a transformed target marker image based on the initial homography matrix, the first source feature point of the target marker image being transformed into a first transformed source feature point in the transformed target marker image;
determine the first feature point in the first video frame according to a position of the first transformed source feature point in the transformed target marker image; and
obtain position information of the first feature point in the first video frame.

16. The apparatus according to claim 15, wherein the processing circuitry is further configured to:
determine a second template region in the transformed target marker image according to the position of the first transformed source feature point in the transformed target marker image;
determine a second search region in the first video frame according to a position of an initial feature point that is associated with the first transformed source feature point and that is in the first video frame;
perform image search in the second search region according to the second template region; and
determine the first feature point according to the initial feature point when a second image similarity between a part of the second search region and the second template region is greater than a second preset similarity threshold.

17. The apparatus according to claim 15, wherein the processing circuitry is further configured to:
after the determine the second feature point information, determine whether an information amount of the second feature point information is less than an amount threshold;
determine a second source feature point in the target marker image when the information amount of the second feature point information is determined to be less than the amount threshold, the second source feature point being transformed into a second transformed source feature point in the transformed target marker image; and
determine additional second feature point information in the second video frame according to a position of the second transformed source feature point in the transformed target marker image.

18. The apparatus according to claim 12, wherein the processing circuitry is further configured to:
determine an optical flow field between the first video frame and the second video frame;
determine an estimated position in the second video frame based on a motion vector for the first feature point in the optical flow field and a position of the first feature point in the first video frame;
determine the first template region in the first video frame according to the position of the first feature point in the first video frame;
determine the first search region in the second video frame according to the estimated position in the second video frame;
perform image search in the first search region according to the first template region; and
determine the second feature point information according to the estimated position when the first image similarity between the part of the first search region and the first template region is greater than the first preset similarity threshold.

19. The apparatus according to claim 12, wherein the processing circuitry is further configured to:
determine a first extrinsic parameter matrix of the apparatus according to the homography matrix when the second video frame is captured by the apparatus; and
perform the first AR processing on the second video frame based on the first extrinsic parameter matrix.

20. A non-transitory computer-readable storage medium storing a program executable by at least one processor to perform:
obtaining first feature point information in a first video frame by performing object recognition to recognize a target object within the first video frame, the target object being included in a target marker image that is retrieved from an attribute database;
tracking, according to an optical flow tracking algorithm, a first feature point corresponding to the first feature point information;
determining second feature point information in a second video frame according to the tracked first feature point and a first image similarity between a part of a first search region in the second video frame and a first template region in the first video frame being greater than a first preset similarity threshold;
constructing a homography matrix between the second video frame and the target marker image according to the second feature point information and a first source feature point of the target marker image; and
performing a first AR processing on the second video frame according to the homography matrix.

* * * * *